(12) United States Patent
Oh et al.

(10) Patent No.: US 12,244,866 B2
(45) Date of Patent: Mar. 4, 2025

(54) DEVICE FOR TRANSMITTING POINT CLOUD DATA, METHOD FOR TRANSMITTING POINT CLOUD DATA, DEVICE FOR RECEIVING POINT CLOUD DATA, AND METHOD FOR RECEIVING POINT CLOUD DATA

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 147 days.

(21) Appl. No.: 17/909,598

(22) PCT Filed: Jan. 20, 2021

(86) PCT No.: PCT/KR2021/095003
§ 371 (c)(1),
(2) Date: Sep. 6, 2022

(87) PCT Pub. No.: WO2021/182937
PCT Pub. Date: Sep. 16, 2021

(65) Prior Publication Data
US 2023/0171431 A1 Jun. 1, 2023

(30) Foreign Application Priority Data
Mar. 11, 2020 (KR) .................. 10-2020-0030181

(51) Int. Cl.
*H04N 19/70* (2014.01)
*H04N 19/119* (2014.01)
(Continued)

(52) U.S. Cl.
CPC .......... *H04N 19/70* (2014.11); *H04N 19/119* (2014.11); *H04N 19/30* (2014.11); *H04N 19/50* (2014.11); *H04N 19/96* (2014.11)

(58) Field of Classification Search
CPC ....................................................... H04N 19/30
See application file for complete search history.

(56) References Cited

U.S. PATENT DOCUMENTS

| 2019/0080483 A1 | 3/2019 | Mammou et al. |
| 2019/0215532 A1 | 7/2019 | He et al. |

(Continued)

FOREIGN PATENT DOCUMENTS

| WO | 2016200114 A1 | 12/2016 |

OTHER PUBLICATIONS

S. Schwarz et al., "Emerging MPEG Standards for Point Cloud Compression", IEEE Journal on Emerging and Selected Topics in Circuits and Systems, vol. 9, No. 1, pp. 133-148, Dec. 10, 2018.

(Continued)

*Primary Examiner* — Jerry T Jean Baptiste
(74) *Attorney, Agent, or Firm* — Bryan Cave Leighton Paisner LLP

(57) ABSTRACT

A method for transmitting point cloud data according to embodiments may comprise the steps of: encoding the point cloud data; and/or transmitting a bitstream including the point cloud data and signaling information. A method for receiving point cloud data according to embodiments may comprise the steps of: receiving a bitstream including the point cloud data and signaling information; decoding the point cloud data; and/or rendering the point cloud data.

15 Claims, 34 Drawing Sheets

(51) Int. Cl.
*H04N 19/30* (2014.01)
*H04N 19/50* (2014.01)
*H04N 19/96* (2014.01)

(56) References Cited

U.S. PATENT DOCUMENTS

2019/0311501 A1* 10/2019 Mammou ............... G06T 9/001
2022/0217343 A1* 7/2022 Zhang .................. H04N 19/119
2022/0312035 A1* 9/2022 Takahashi ............ H04N 21/816

OTHER PUBLICATIONS

K. Mammou, "PCC Test Model Category 2 v0", International Organisation for Standardisation Organisation International De Normalisation ISO/IEC JTC1/SC29/WG11 Coding of Moving Pictures and Audio, N17248, pp. 1-11, Oct. 2017.

* cited by examiner

FIG. 6
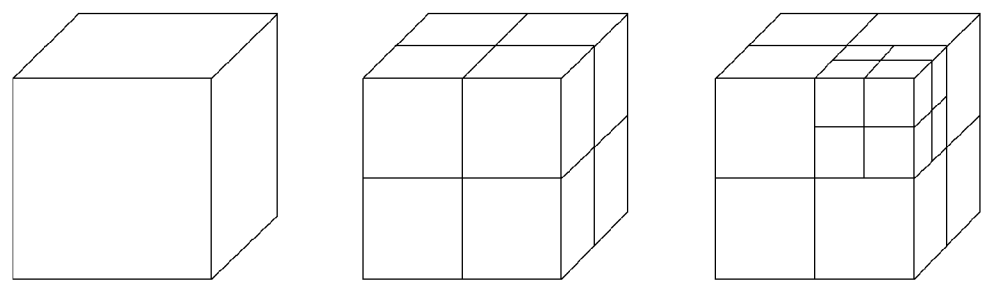
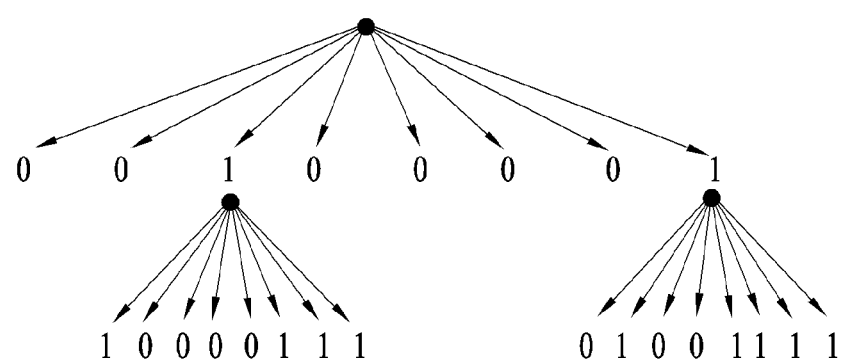

FIG. 7
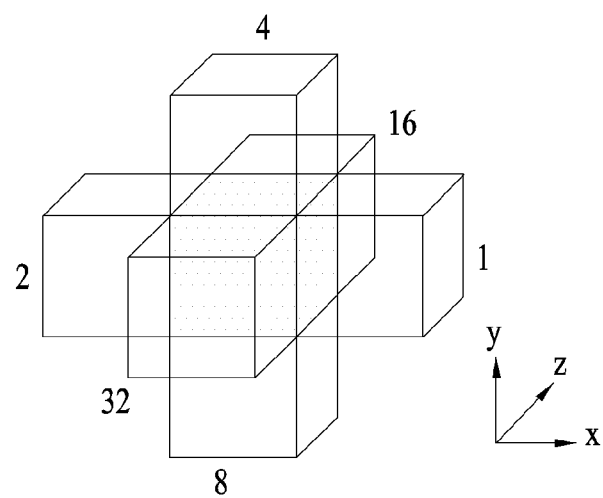
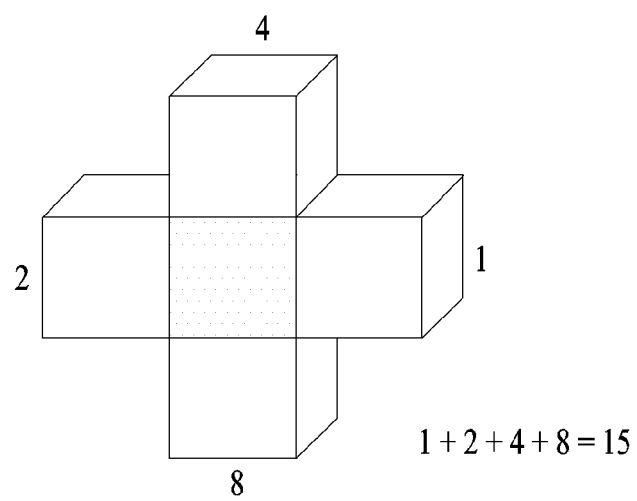
$1 + 2 + 4 + 8 = 15$

FIG. 29

| geometry_parameter_set( ) { | Descriptor |
|---|---|
| .... | |
| gps_geometry_prediction_flag | u(1) |
| if(gps_geometry_prediction_flag) { | |
| pred_grouping_method | u(4) |
| num_pred_groups | u(8) |
| for (i = 0; i < num_pred_groups; i++) { | |
| num_of_ref_groups[i] | u(8) |
| if(num_of_ref_groups[i] > 0) { | |
| group_ref_mode[i] | u(2) |
| if(group_ref_mode[i] == 0) | |
| num_ref_groups[i] | u(1) |
| else if(group_ref_mode[i] == 1) { | u(1) |
| num_ref_groups[i] | u(8) |
| for( j = 0; j < num_ref_groups[i]; j++ ) | |
| ref_index[i][j] | u(8) |
| } | |
| else if (group_ref_mode[i] == 2) { ... } | |
| } | |
| correlated_data_search_method | u(4) |
| pred_method[i] | u(4) |
| pred_param_a[i] | u(8) |
| pred_param_b[i] | u(8) |
| transform_enable_flag[i] | u(1) |
| qnant_mode[i] | u(4) |
| } | |
| } | |
| ... | |

FIG. 30

| | Descriptor |
|---|---|
| geometry_slice_header() { | |
| ... | |
| geom_pred_grouping_method | u(4) |
| num_of_ref_groups | u(8) |
| if(num_of_ref_groups > 0) { | |
| group_ref_mode | u(2) |
| if(group_ref_mode == 0) | |
| num_ref_groups | u(1) |
| else if(group_ref_mode == 1) { | |
| num_ref_groups | u(8) |
| for(j=0;j<num_ref_groups;j++) | |
| ref_index[j] | u(8) |
| } | |
| else if(group_ref_mode == 2) { } | |
| } | |
| correlated_data_searching_method | u(4) |
| pred_method | u(4) |
| pred_param_a | u(8) |
| pred_param_b | u(8) |
| transform_enable_flag | u(1) |
| qnant_mode | u(4) |
| gsh_num_points | |
| ... | |

(a)

| | Descriptor |
|---|---|
| geometry_slice_data() { | |
| if( gps_geometry_prediction_flag) { | |
| for( i = 0; i < gsh_num_points; ++i) { | |
| children_count[i] | u(8) |
| num_ref_groups[i] | u(8) |
| for( j = 0; j < num_ref_groups[i]; j++) | |
| ref_index[i][j] | u(8) |
| pred_method[i] | u(8) |
| pred_param_a[i] | u(8) |
| pred_param_b[i] | u(8) |
| for( j = 0; j < 3; ++j) | |
| residual[i][j] | u(i) |
| } | |
| } | |
| ... | |

| sequence_parameter_set ( ) { | Descriptor |
|---|---|
| .... | |
| common_grouping_method_flag | u(1) |
| if(common_grouping_method_flag) | |
| common_pred_grouping_method | u(4) |
| .... | |

| geometry_parameter_set ( ) { | Descriptor |
|---|---|
| .... | |
| if(!common_grouping_method_flag) | |
| geom_pred_grouping_method | u(4) |
| .... | |

| attribute_parameter_set( ) { | Descriptor |
|---|---|
| .... | |
| if(!common_grouping_method_flag) | |
| geom_pred_grouping_method | u(4) |
| .... | |

DEVICE FOR TRANSMITTING POINT CLOUD DATA, METHOD FOR TRANSMITTING POINT CLOUD DATA, DEVICE FOR RECEIVING POINT CLOUD DATA, AND METHOD FOR RECEIVING POINT CLOUD DATA

This application is the National Phase of PCT International Application No. PCT/KR2021/095003, filed on Jan. 20, 2021, which claims the benefit of Korean Patent Application No. 10-2020-0030181, filed on Mar. 11, 2020, which is hereby incorporated by reference herein in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages, a method for transmitting point cloud data according to embodiments may include encoding point cloud data, and/or transmitting a bitstream containing the point cloud data and signaling information.

According to embodiments, the encoding may include encoding geometry data, and encoding attribute data. The encoding of the geometry data may include grouping points into a plurality of groups, predicting geometry data about the points by determining a parent-child relationship between the points based on the grouped plurality of groups, and/or generating residual information based on the predicted geometry data about the points.

Further, according to embodiments, the grouping may include generating a plurality of retained groups based on a level of detail (LOD). Herein, the level of detail may represent a set of points spaced apart by a distance shorter than a sampling distance corresponding to each level, wherein the retained groups may represent, for each level, groups of points corresponding to a difference between the level of detail of a current level and the level of detail of a next level.

Further, a parent of points in the retained group of a first level may be one of points included in the retained group of the first level. The parent of the points in the retained group of the first level may be one of points included in the retained group of a second level higher than the first level. Alternatively, the parent of the points in the retained group of the first level may be one of points included in an LOD group of the first level.

Further, according to embodiments, the predicting may include predicting the geometry data about the points using a prediction tree representing the adjacency relationship between the points.

Further, according to embodiments, the signaling information may include information indicating a method for performing the grouping, and information indicating a method for performing the prediction.

To achieve these objects and other advantages, a method for receiving point cloud data may include receiving a bitstream containing point cloud data and signaling information, decoding the point cloud data, and rendering the point cloud data.

Further, according to embodiments, the decoding may include decoding geometry data for the point cloud data, and decoding attribute data for the point cloud data, wherein the signaling information may include information indicating a method for performing grouping of points, and information indicating a method for performing prediction.

Further, according to embodiments, the decoding of the geometry data may include, in order to determine a parent-child relationship between the points, searching for correlated data about the points based on the information indicating the method for performing the grouping, and/or predicting the geometry data about the points based on the method for performing the prediction.

Further, according to embodiments, the prediction may include predicting the geometry data about the points using a prediction tree representing a parent-child relationship.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 illustrates an exemplary bounding box of a point cloud according to embodiments;

FIG. 7 illustrates an example of determination of individual patch positions on an occupancy map according to embodiments;

FIG. 29 shows a geometry parameter set (GPS) according to embodiments;

FIG. 30 shows a geometry slice header (GSH) and geometry slice data according to embodiments;

FIG. 31 shows a sequence parameter set (SPS), a geometry parameter set (GPS), and an attribute parameter set (APS) according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
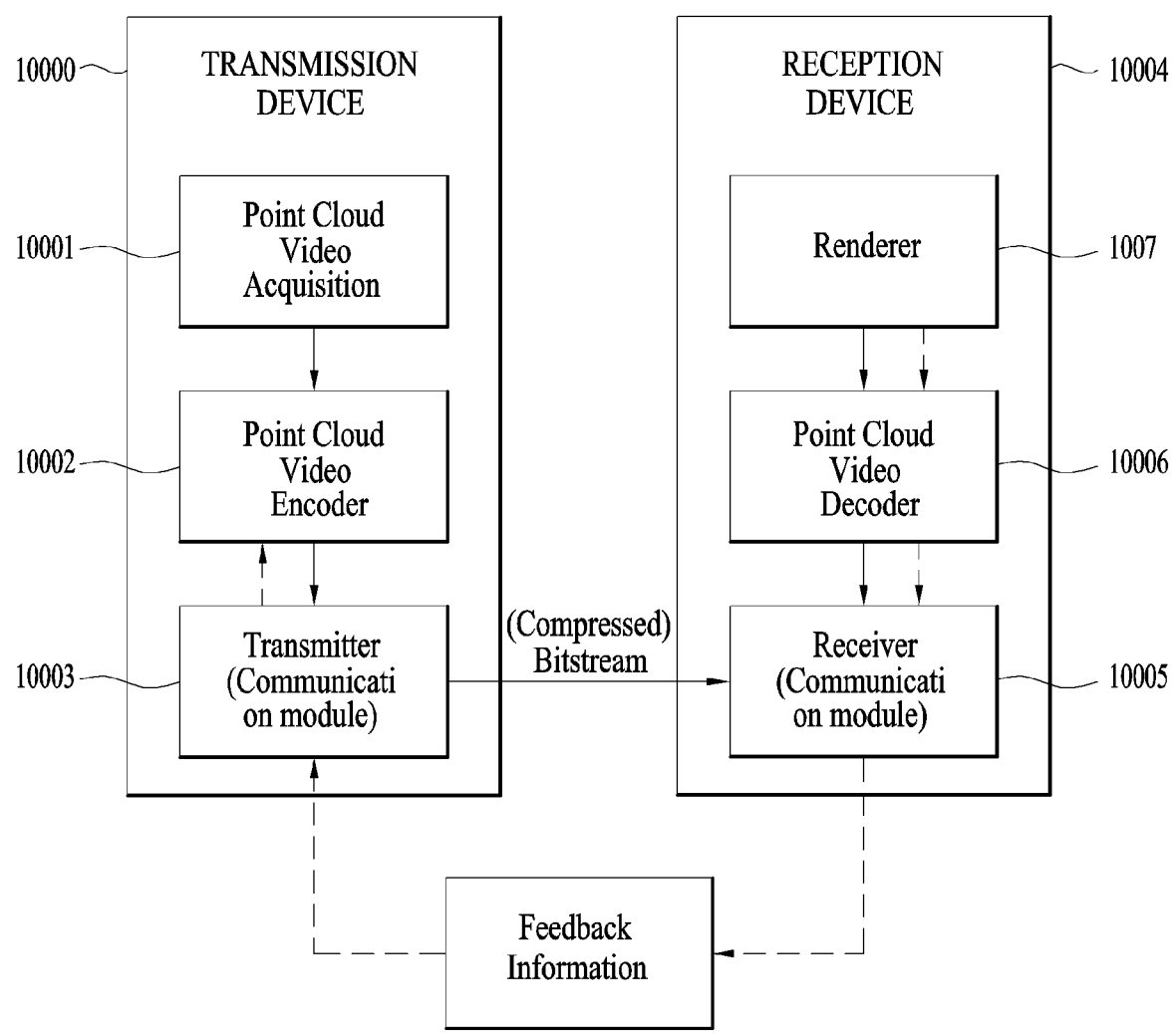
FIG. 1 illustrates an exemplary structure of a transmission/reception system for providing point cloud content according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
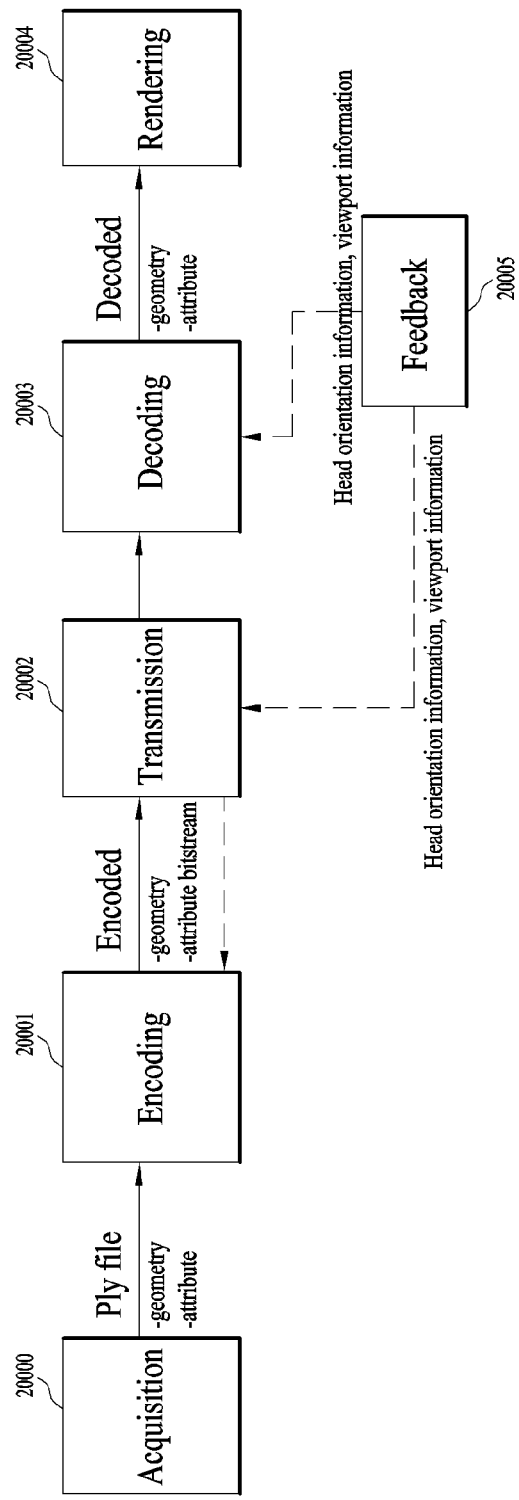
FIG. 2 illustrates capture of point cloud data according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
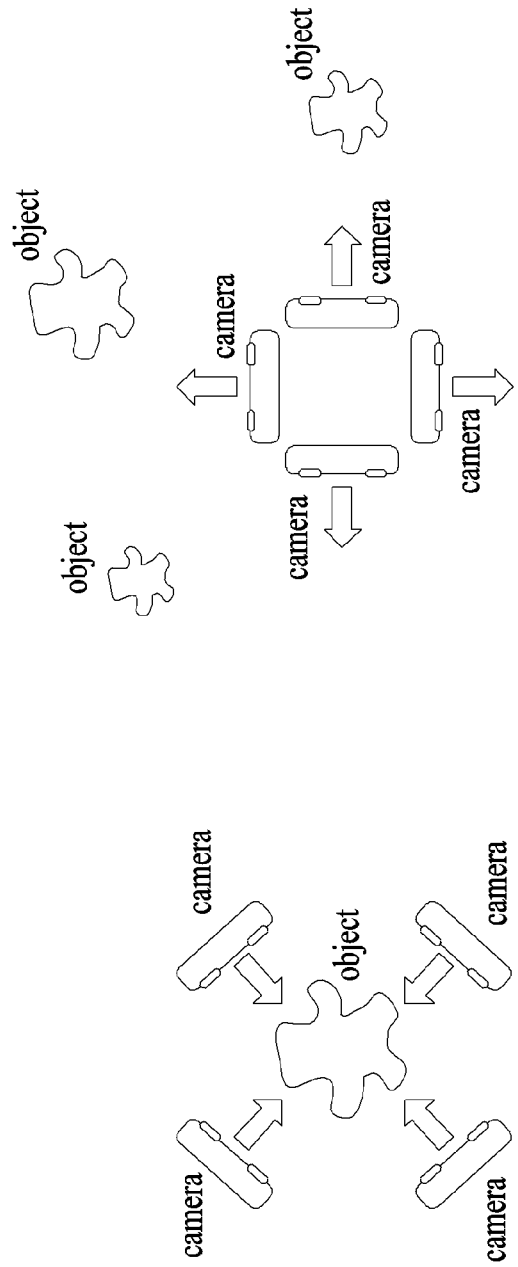
FIG. 3 illustrates an exemplary point cloud, geometry, and texture image according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
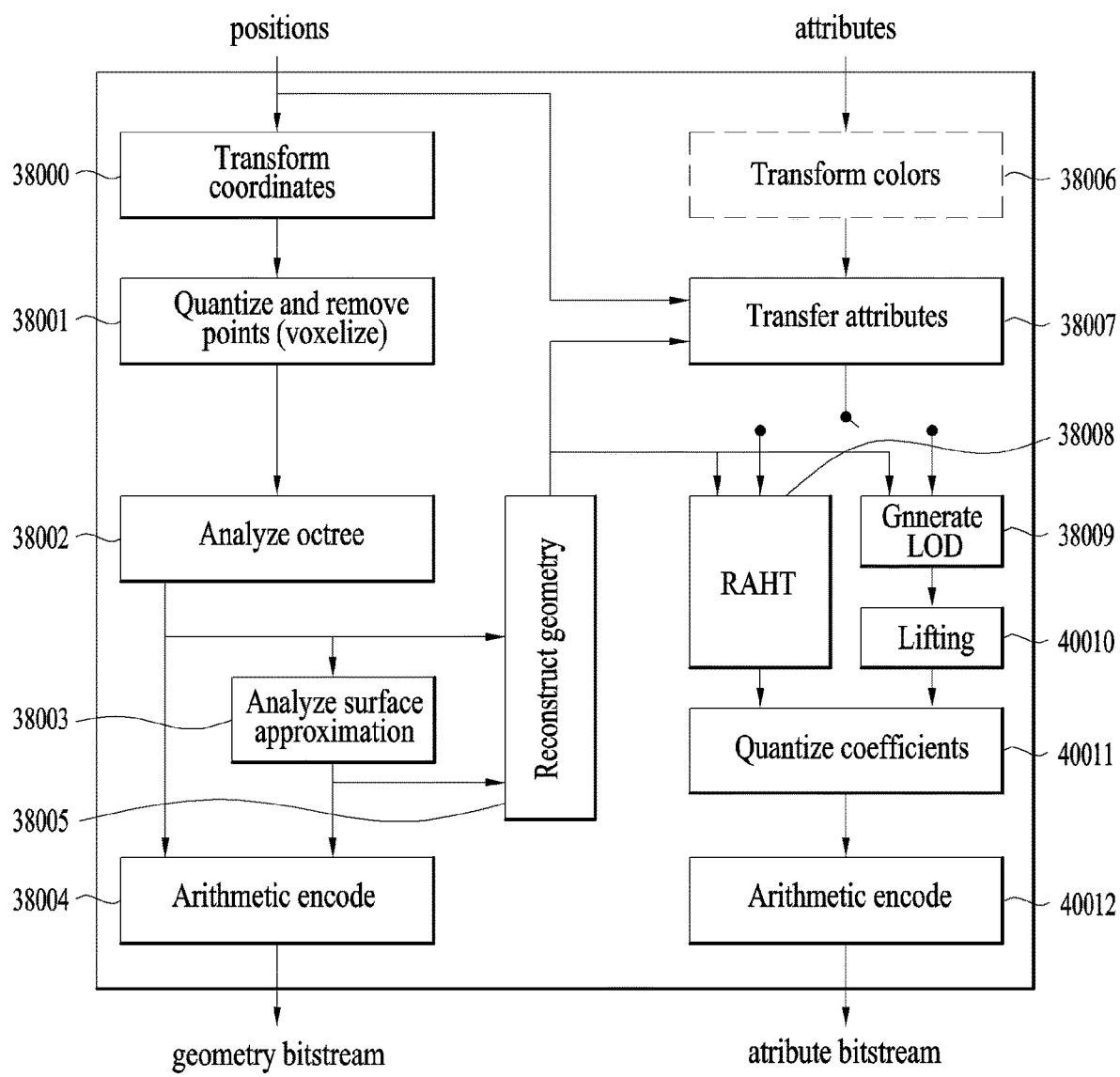
FIG. 4 illustrates an exemplary V-PCC encoding process according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
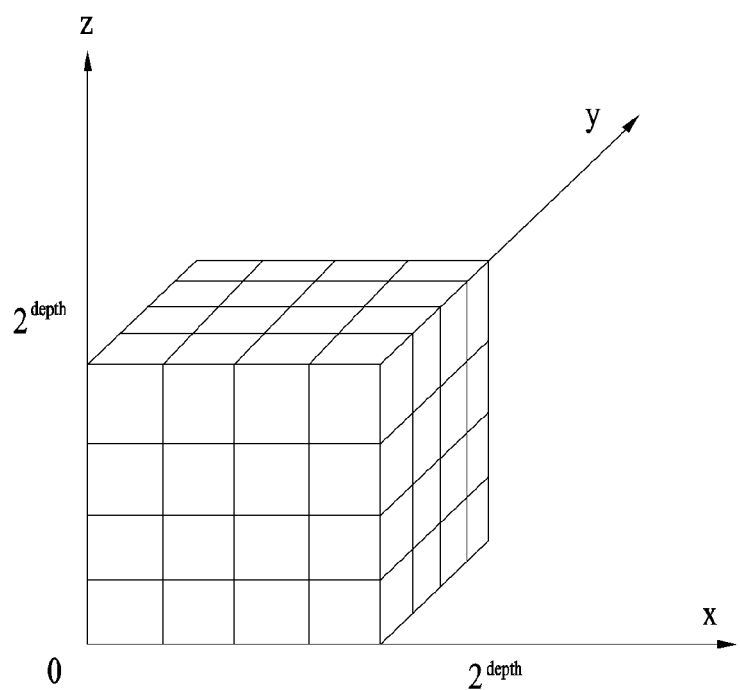
FIG. 5 illustrates an example of a tangent plane and a normal vector of a surface according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log2}(\text{Max}(x_n^{int}, y_n^{int}, z_n^{int}, n=1, \ldots, N)+))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{k=1}^{n} \begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{k=1}^{n} \begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2 3=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
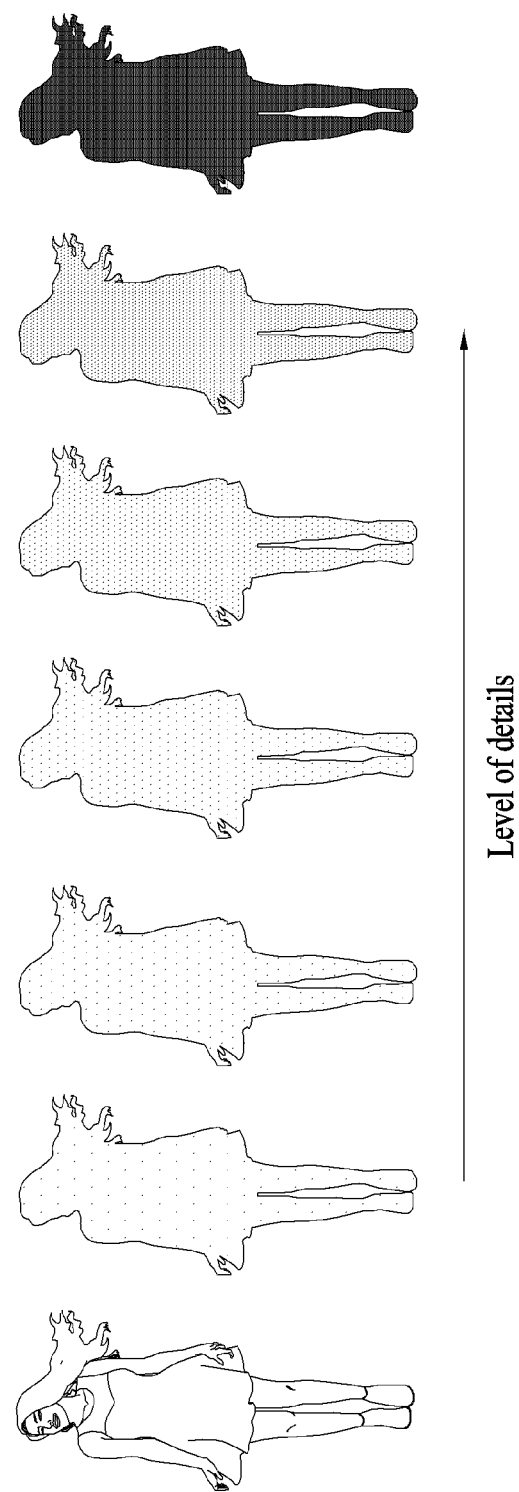
FIG. 8 shows an exemplary relationship among normal, tangent, and bitangent axes according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
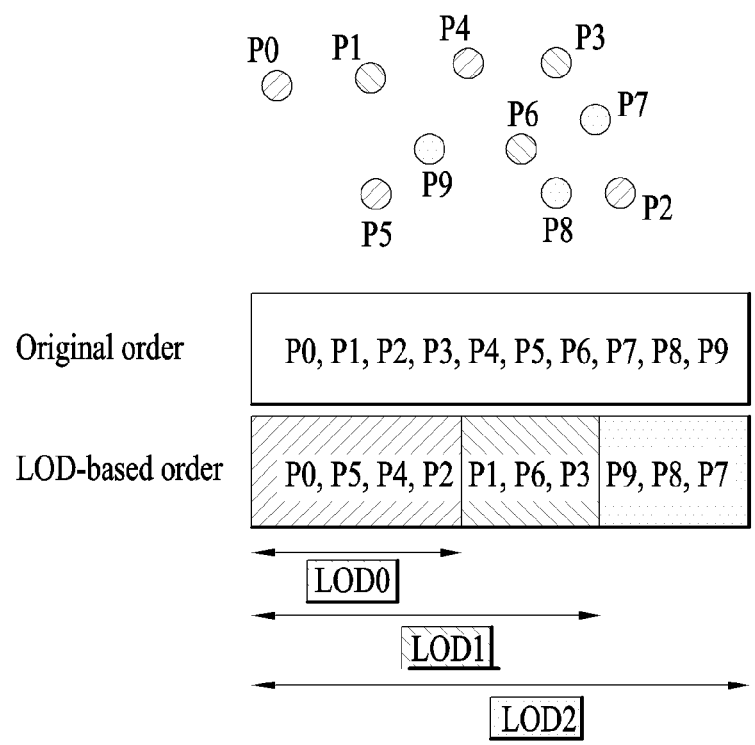
FIG. 9 shows an exemplary configuration of the minimum mode and maximum mode of a projection mode according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

TABLE 1

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE Attribute prediction residuals inverse quantization pseudo code

TABLE 2

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
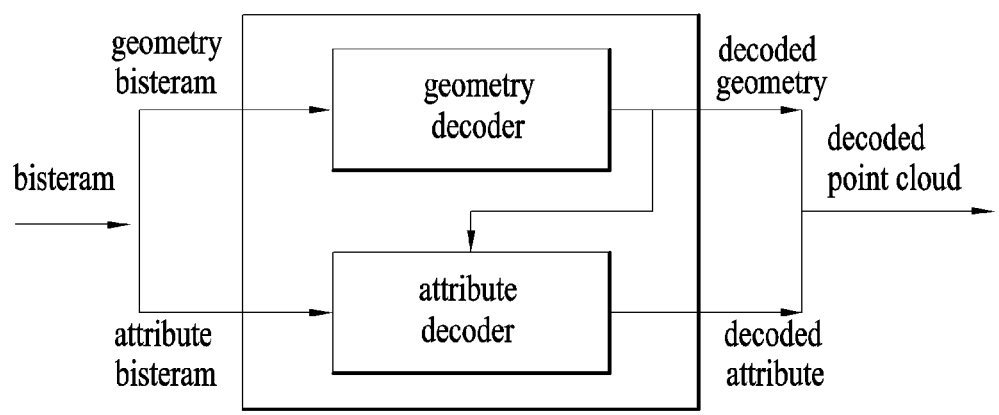
FIG. 10 illustrates an exemplary EDD code according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
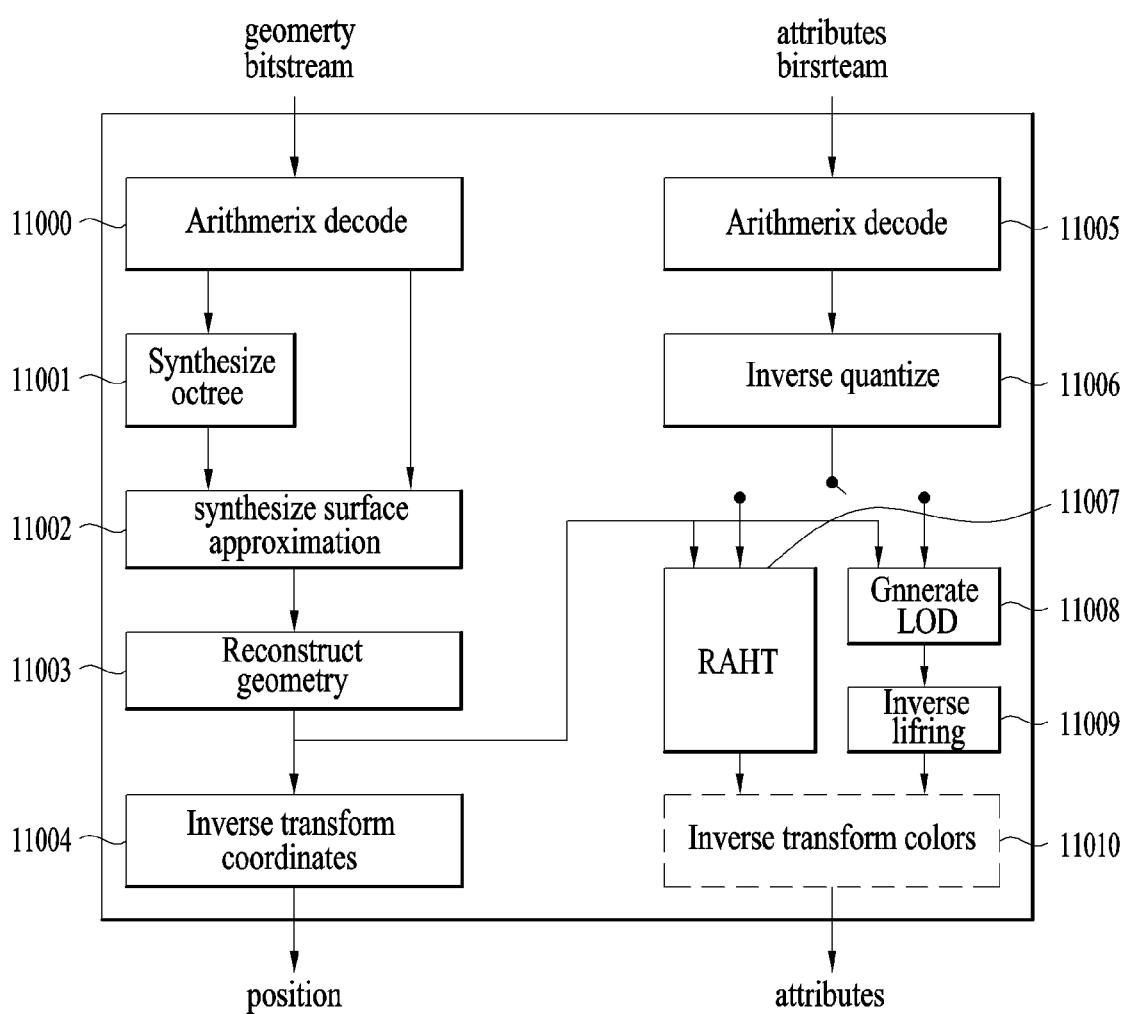
FIG. 11 illustrates an example of recoloring based on color values of neighboring points according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
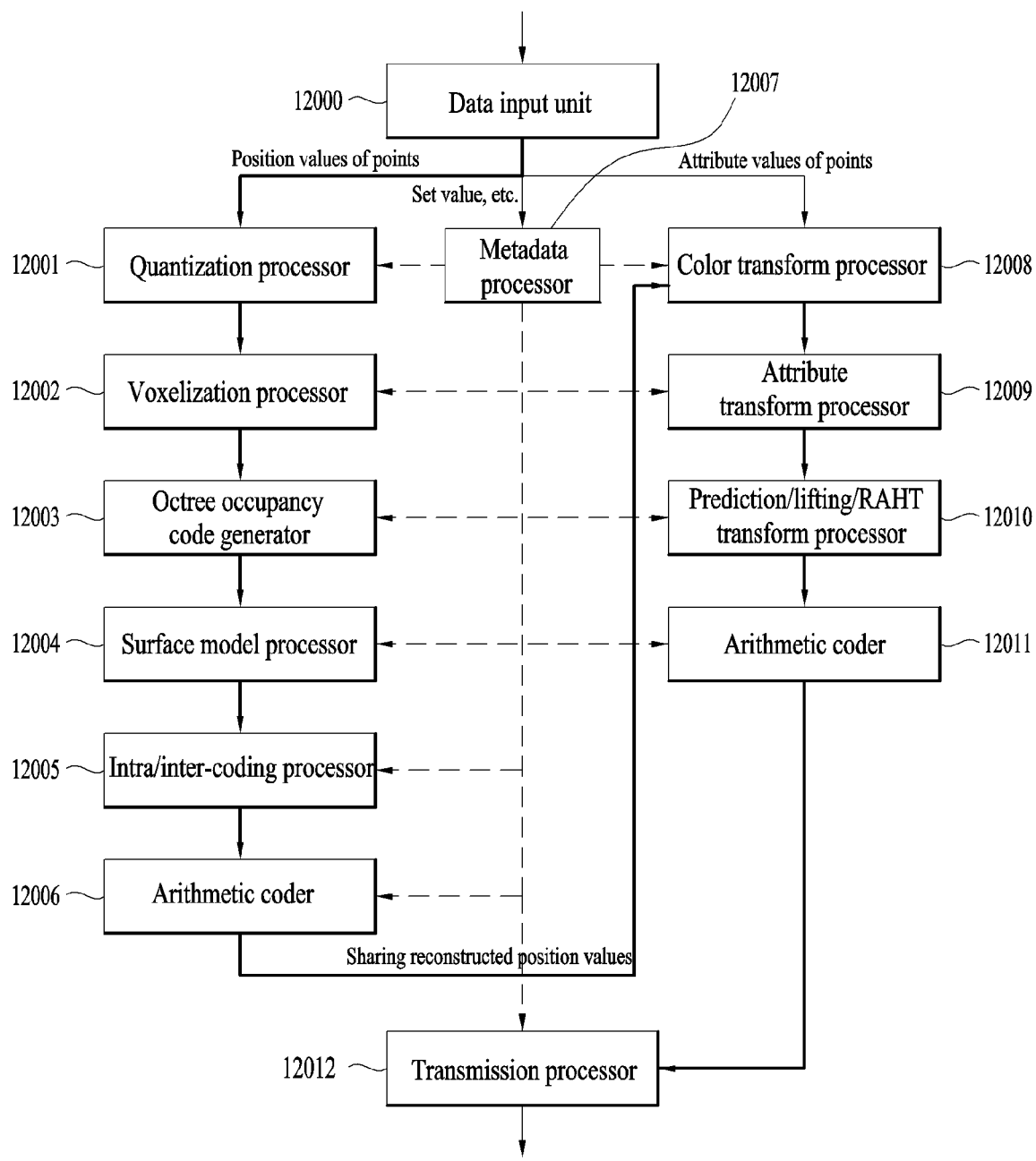
FIG. 12 illustrates an example of push-pull background filling according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream GeomO® and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
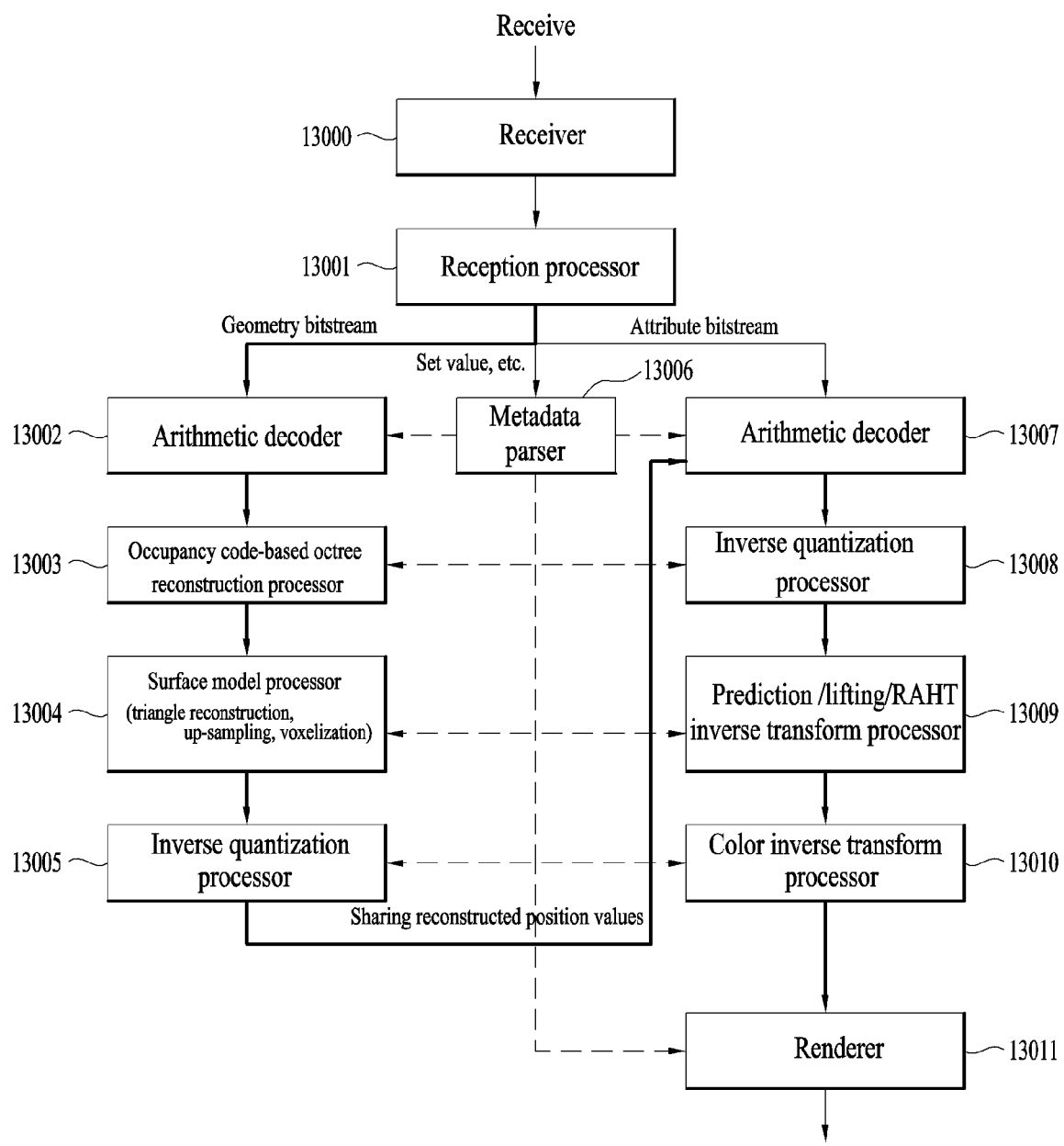
FIG. 13 shows an exemplary possible traversal order for a 4*4 block according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
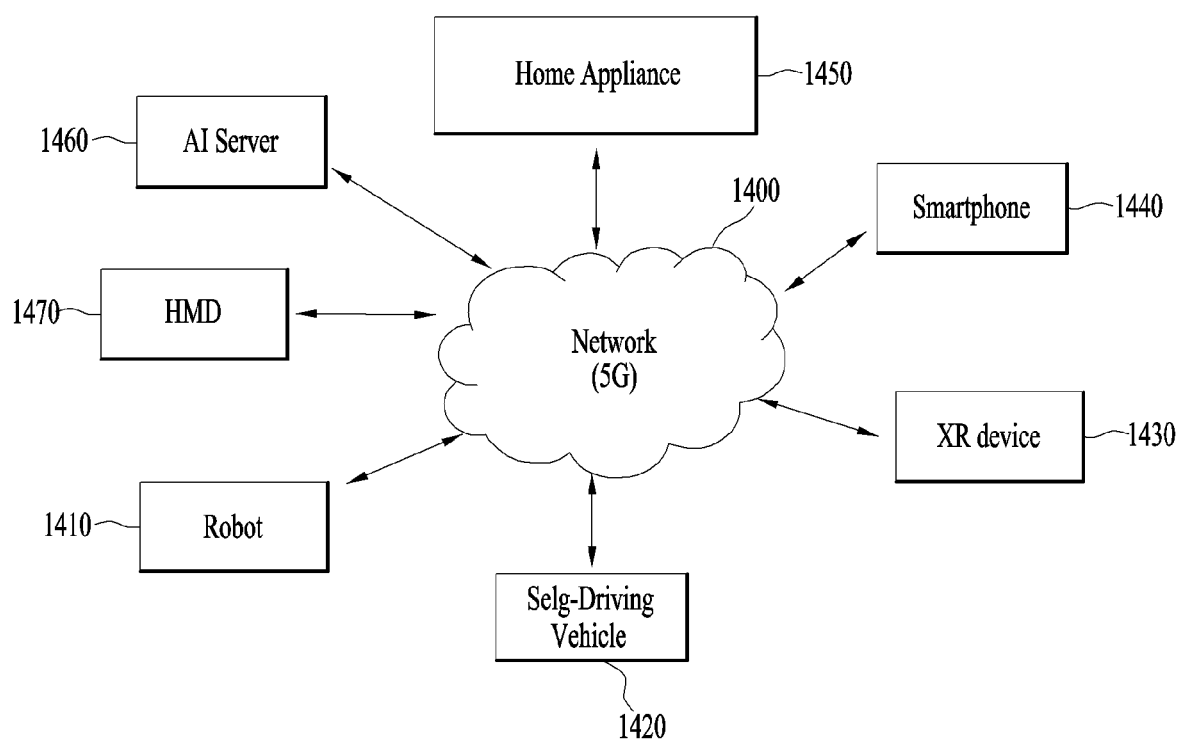
FIG. 14 illustrates an exemplary best traversal order according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
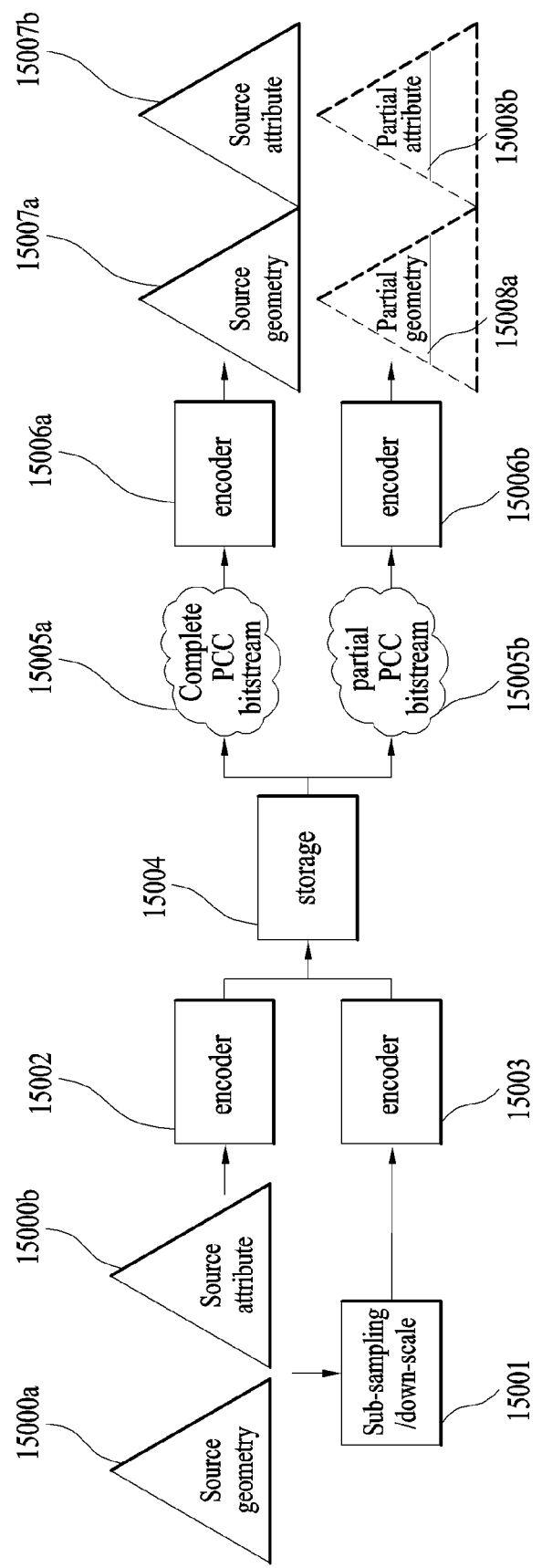
FIG. 15 illustrates a point cloud data transmission/reception system according to embodiments.

FIG. 15 illustrates a point cloud data transmission/reception system according to embodiments.

FIG. 15 illustrates an operation of a point cloud data transmission device acquiring, encoding, and transmitting point cloud data, and a process in which a point cloud data reception device decodes the point cloud data in a bitstream form according to embodiments.

The point cloud data transmission device includes a point cloud data acquirer, a sub-sampling/down-scaling unit 15001, encoder 15002, 15003, and/or a storage 15004 for transmission.

For example, the point cloud data acquirer performs the point cloud video acquisition 10001 of FIG. 1, the acquisition 20000 of FIG. 2, and the operation of FIG. 3. The point cloud data acquirer acquires geometry data indicating positions of points in the point cloud data and attribute data indicating attributes of the points. The geometry data may be referred to as source geometry 15000a, and attribute data may be referred to as source attribute 15000b.

For example, the sub-sampling/down-scaling unit 15001 may sub-sample or down-scale the geometry data.

The sub-sampled or down-scaled geometry data may be referred to as partial geometry data, and the sub-sampled or down-scaled attribute data may be referred to as partial attribute data.

The encoder 15002, 15003 may represent, for example, a first encoder 15002 configured to encode all of the geometry data 15000a and the attribute data 15000b, or a second encoder 15003 configured to encode the partial geometry data and/or partial attribute data obtained by sub-sampling or down-scaling by the sub-sample/down-scaling unit 15001.

The encoder 15002, 15003 according to the embodiments represents the point cloud video encoder 10002 of FIG. 1 or the encoding 20001 of FIG. 2. The encoder 15002, 15003 may include some or all of the components shown in FIG. 4 or 12.

For example, when the first encoder 15002 encodes both geometry data 15000a and attribute data 15000b, the encoder 15002 generates a complete PCC bitstream including geometry data about all points and attribute data about all points.

For example, when the second encoder 15003 encodes only partial geometry data and/or partial attribute data, the encoder 15003 generates a partial PCC bitstream including geometry data for some points and attribute data for some points.

According to embodiments, the point cloud data transmission device may include only the first encoder, only the second encoder, or an encoder capable of selectively performing the operations of the first encoder and the second encoder.

The storage 15004 for transmission stores the encoded geometry data and/or encoded attribute data to transmit the same in the form of a bitstream or file. The storage 15004 for transmission may perform, for example, operations of the transmitter 10003 of FIG. 1, the transmission unit 20002 of FIG. 2, and the transmission processor 12012 of FIG. 12.

The point cloud data reception device includes a storage 15004 for reception and decoders 15006a and 15006b.

The storage 15004 for reception includes a bitstream (or file) containing point cloud data according to embodiments. The bitstream (or file) may include, for example, a complete PCC bitstream 15005a or a partial PCC bitstream 15005b.

For example, the decoders 15006a and 15006b may represent a first decoder 15006a configured to decode the complete PCC bitstream, or a second decoder 15006b configured to decode the partial PCC bitstream 15005b.

For example, the first decoder 15006a decodes the complete PCC bitstream and generates geometry data 15007a and attribute data 15007b about all points of the point cloud data.

For example, the second decoder 15006b decodes the partial PCC bitstream and generates geometry data 15008a and attribute data 15008b about some points of the point cloud data.

According to embodiments, the point cloud data reception device may include only the first decoder, only the second decoder, or a decoder capable of selectively performing the operations of the first decoder and the second decoder.

When encoding point cloud data, the point cloud data transmission device according to embodiments may apply a predictive coding technique for performing prediction on some or all points by providing information on points around a specific point. The prediction-based compression (predictive coding) may increase the decoding speed of the reception device. However, when part of the given information is decoded, a point cloud in some regions may be acquired, but it is difficult to present meaningful information in rendering to the user by the reception device because there is no meaning assgined to the regions.

In addition, when the reception device according to the embodiments receives and decodes all point cloud data through, for example, the first decoder, unnecessary delay may occur in processing point cloud data due to the performance of the receiver or a transmission environment. In this case, a lot of time may be wasted in receiving and reconstructing the complete data.

Accordingly, the transmission device according to the embodiments may transmit only some of the transmitted data by compressing/transmitting the point cloud data in semantic units, and the reception device according to the embodiments may acquire information on the complete data even when only partial data is decoded, thereby providing excellent performance in terms of time complexity and space complexity.

In addition, the reception device according to the embodiments may achieve (e.g., LOD-based) scalable point cloud representation by selectively selecting as many points as the detail of desired content.

This configuration may allow the point cloud data transmission device according to the embodiments to perform encoding at a high speed in an environment requiring low delay. In addition, the transmission device performs encoding based on the prediction unit group and transmits only unit information required by the receiving apparatus, thereby enabling the reception device to adaptively perform decoding in the transmission/reception environment and provide a coding method suitable for a low delay environment. Such a configuration may also enable the reception device to perform scalable decoding.

Hereinafter, a method for compressing and transmitting point cloud data in semantic units by a transmission device and decoding and processing the point cloud data by a reception device, and an apparatus therefor are disclosed. In other words, hereinafter, the transmitter uses prediction-based compression techniques (predictive coding) to reduce the time required for encoding (low delay), reproduce a low-density point cloud with some point cloud data, and introduce a point cloud data encoding method suitable for low delay transmission environments. Hereinafter, a method for compressing position information (geometry data) about points of the point cloud data is described, but the following details may also be applied to attribute information (attribute data) about point cloud or a general prediction-based compression method.

Figure 16:
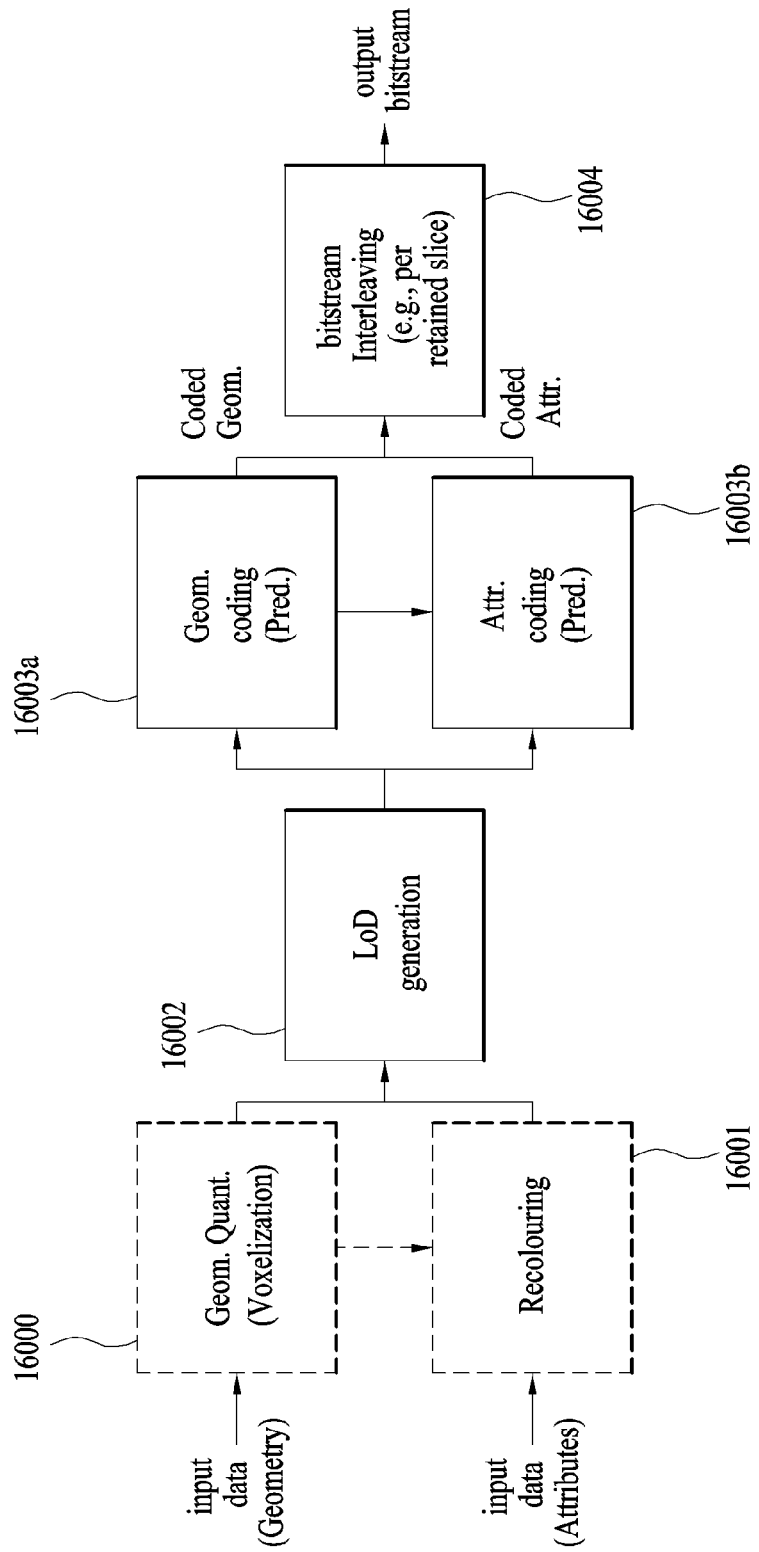
FIG. 16 illustrates an encoder of a point cloud data transmission device according to embodiments.

FIG. 16 illustrates an encoder of a point cloud data transmission device according to embodiments.

The encoder of the point cloud data transmission device shown in FIG. 16 may be referred to as a prediction-based encoder, a prediction-based scalable point cloud encoder, a scalable encoder, or the like.

The encoder of the point cloud data transmission device shown in FIG. 16 may represent the point cloud video encoder 10002 of FIG. 1 and the encoding unit 20001 of FIG. 2, and the components of FIG. 4 may include the components of FIG. 12. The encoder of the point cloud data transmission device shown in FIG. 16 may represent the first encoder 15002 and/or the second encoder 15003 shown in FIG. 15.

The encoder of the point cloud data transmission device shown in FIG. 16 may be included in the robot 1710, the self-driving vehicle 1720, the XR device 1730, the smartphone 1740, the home appliance 1750, the AI server 1760 or the HMD 1770 of FIG. 14.

The point cloud data transmission device includes a geometry quantization voxelization unit 16000, an attribute recolorer 16001, an LOD generator 16002, a geometry coder 16003a, an attribute coder 16003b, and a bitstream interleaver 16004.

The geometry quantization voxelization unit 16000 receives geometry data of the acquired point cloud data according to embodiments, and quantizes and/or voxelizes the same. The geometry quantization voxelization unit 16000 may be operated by, for example, the point cloud video encoder 10002 of FIG. 1 or the encoding unit 20001 of FIG. 2, and may perform the operation of the quantization and point removal (voxelization) unit 40001 of FIG. 4. The geometry quantization voxelization unit 16000 performs the operations shown in FIGS. 5 and 6. The geometry quantization voxelization unit 16000 may represent the quantization processor 12001 and/or the voxelization processor 12002 of FIG. 12.

The attribute recolorer 16001 receives attribute data of the acquired point cloud data according to embodiments and performs color transform on the attribute data. The attribute recolorer 16001 may be operated by, for example, the point cloud video encoder 10002 of FIG. 1 or the encoding unit 20001 of FIG. 2, and may perform the operations of the color transformer 40006 and the attribute transformer 40007 of FIG. 4.

The LOD generator 16002 configures a level of detail (LOD) of points based on the geometry data and/or the attribute data according to the embodiments. The LOD generator 16002 generates an LOD group and/or a refined group by classifying the points according to the LODs. The refined group may be referred to as a retained group.

The LOD refers to a set of points spaced apart by a shorter distance than a sampling distance corresponding to each LOD level. That is, the LOD group L(k) includes a set of points spaced apart by a shorter distance than the sampling distance corresponding to the level of the LOD group.

For example, when it is assumed that the LOD group L(4) of level 4 has a sampling distance of 10, the LOD group of level 4 is a set of points except for points which are at a distance shorter than 10 from each other.

As the level of the LOD rises, the sampling distance decreases. Therefore, the LOD group L(2) of level 2 includes all points of the LOD group L(1) of level 1, the LOD group L(3) of level 3 includes all points of the LOD group L(2) of level 2, and the LOD group L(k) of level k includes all points of the LOD group L(k−1) of level k−1.

That is, an LOD is a degree to which the detail of the point cloud content is represented. Thus, decrease in the LOD value means decrease of the detail of the point cloud content, and increase in the LOD value means increase of the detail of the point cloud content. Points may be classified according to the LOD.

A retained group (or refined group) R(k) represents, for each level, groups of points corresponding to a difference between the LOD of a current level and the LOD of the next level. The retained group may be defined as follows. The backslash (\) denotes a difference operator.

$R(0) = LoD(0)$ $R(k) = L(k) \backslash L(k-1) = L(k) \cap L(k-1)^c$ $R0 \cup R1 \cup \ldots \cup Rn = N$ The point cloud data transmission device and/or reception device according to the embodiments may generate an LOD in various ways. A method for generating the LOD by the LOD generator 16002 will be described in detail with reference to FIG. 23.

The geometry encoder 16003a fully or partially encodes the geometry data according to embodiments. The geometry encoder 16003a may fully encode the geometry data (full geometry encoding), or encode only a part of the geometry data (partial geometry encoding). The geometry encoder 16003a may encode only specific LOD groups generated by the LOD generator 16002, specific retained groups, or a new set of geometry data generated therefrom.

The geometry encoder 16003a may perform prediction-based encoding (Prediction-based point cloud compression). For example, the geometry encoder 16003a may group geometry data of the point cloud data into multiple groups (e.g., retained groups, LOD groups, etc.). The geometry encoder 16003a may perform prediction based on the multiple groups into which the geometry data is grouped.

A grouped group, i.e., a prediction group, is a group consisting of one or more points belonging to point cloud data to be compressed, and has a certain relationship between data present in the respective groups. In the prediction-based encoding, compression and/or encoding may be performed based on one or more prediction groups, and it may be defined that 1) the groups are independent of each other, 2) some data of one group is included in another group, or 3) one group is included in another group. For example, when there is point cloud data distinguished by LoDs, a retained data group may be configured as a prediction group.

The geometry encoder 16003a predicts geometry information about points. Based on geometry information about a first point, the geometry encoder 16003a predicts geometry information about a second point. The first point and the second point may have, for example, a parent-child relationship, and the geometry encoder 16003a may generate a prediction tree by establishing such parent-child relationships of all points. The parent-child relationship may be referred to by various terms such as an adjacency relationship or an upper-lower node relationship.

The geometry encoder 16003a predicts geometry information about all points based on a prediction method. The prediction method may be carried out by, for example, multiplying, adding, or subtracting a predetermined constant or the like with respect to a parent of a specific point.

The geometry encoder 16003a may compare each of the points predicted based on the prediction method with the source geometry data to generate a prediction error. The prediction error may mean a difference between the predicted geometry information about each point and actual source geometry information. The prediction error may be referred to as residual information.

The geometry encoder 16003a may transform geometry information about a specific point and residual information for each point.

The attribute encoder 16003b fully or partially encodes the attribute data according to embodiments. The attribute encoder 16003b may fully encode the attribute data (full attribute encoding), or encode only a part thereof (partial attribute encoding). The attribute encoder 16003b may perform encoding only on specific LOD groups generated by the LOD generator 16002, specific retained groups, or a new set of attribute data generated therefrom.

The attribute encoder 16003b may reconstruct the geometry data encoded by the geometry encoder 16003a and encode the attribute data based on the reconstructed geometry data. The attribute encoder 16003b may be included in the point cloud encoder 10002 of FIG. 1 or the encoding unit 20001 of FIG. 2, and may perform the operations of the geometry reconstructor 40005, the color transformer 50006, the attribute transformer 40007, the coefficient quantizer 40011, and the arithmetic encoder 40012. The attribute encoder 16003b may perform the operation of the color transform processor 12008, the attribute transform processor 12009, or the arithmetic coder 12011 of FIG. 12.

The bitstream interleaver 16004 interleaves the geometry data encoded by the geometry encoder 16003a and the attribute data encoded by the attribute encoder 16003b to generate an output bitstream. The bitstream interleaver 16004 transforms the encoded data (e.g., LOD group, retained group) into a bitstream and outputs the bitstream for each group configured by grouping according to embodiments.

The point cloud data transmission device according to the embodiments may encode the point cloud data in consideration of scalable decoding of the reception device.

When the geometry encoder 16003a uses prediction-based point cloud compression for geometry data according to the embodiments, the geometry encoder 16003a may process the point cloud compression in parallel with prediction-based attribute data compression based on the generated LOD.

For example, when common_grouping_method_flag is 1, the attribute encoder 16003b may compress the attribute data based on group (e.g., LOD group, etc.) information used for coding of geometry information. That is, the attribute encoder 16003b may compress the attribute data based on the LOD group generated by the LOD generator 16002.

The bitstream interleaver 16004 may configure a bitstream on a per retained group (e.g., retained slice) basis after coding the geometry data and attribute data on an LOD-by-LOD basis, and may interleave the geometry bitstream and the attribute bitstream on the LOD-by-LOD basis.

For example, suppose that a geometry slice and an attribute slice in a retained group of level k are defined as Rk-G and Rk-A. When the bitstream interleaver 16004 transmits point cloud data corresponding to the LOD of level n to the reception device, the geometry bitstream and the attribute bitstream may be interleaved in order of R0-G, R0-A, R1-G, R1-A, . . . , Rn-G, and Rn-A, and transmitted to the reception device.

As another example, the point cloud data reception device according to the embodiments may selectively use only a bitstream corresponding to a specific retained group.

The operation of the bitstream interleaver 16004 described above may allow the reception device according to the embodiments to achieve scalable point cloud presentation by selecting an LOD corresponding to the detail of desired content. For example, when decoding is performed only up to LOD level 3 due to the reception environment of the reception device, the reception device may receive only R0-G, R0-A, R1-G, R1-A, R2-G, R2-A, R3-G, and R3-A and decode the same to perform rendering.

In addition, the configuration described above may allow the point cloud data transmission device according to the embodiments to perform encoding at a high speed in an environment requiring low delay. In addition, the transmission device may perform encoding based on the prediction unit group and transmit only unit information required by the reception device, thereby enabling the reception device to adaptively perform decoding in the transmission/reception environment and providing a coding method suitable for the low delay environment. The configuration may also enable the reception device to perform scalable decoding.

Figure 17:
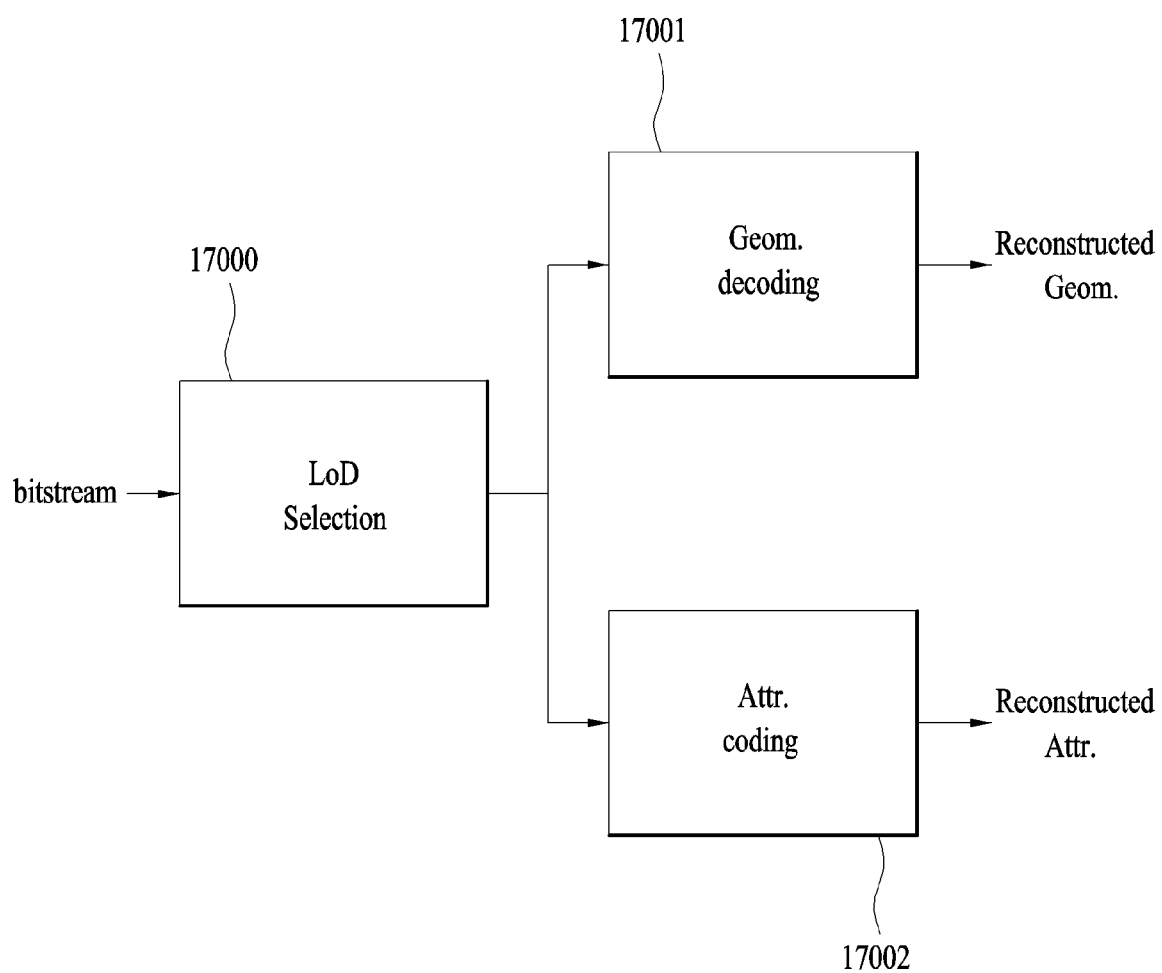
FIG. 17 illustrates a decoder of a point cloud data reception device according to embodiments.

FIG. 17 illustrates a decoder of a point cloud data reception device according to embodiments.

The decoder of the point cloud data reception device shown in FIG. 17 may be referred to as a prediction-based decoder, a prediction-based scalable point cloud decoder, or a scalable decoder.

The decoder of the point cloud data reception device shown in FIG. 17 may represent/include the point cloud video decoder 10006 of FIG. 1, the decoding unit 20003 of FIG. 2, the components shown in FIG. 11, and the components shown in FIG. 13.

The decoder of the point cloud data reception device shown in FIG. 17 may be included in the robot 1710, the self-driving vehicle 1720, the XR device 1730, the smartphone 1740, the home appliance 1750, the AI server 1760, or the HMD 1770 of FIG. 14.

The decoder of the point cloud data reception device according to the embodiments shown in FIG. 17 may represent the first decoder 15006a and/or the second decoder 15006b shown in FIG. 15.

The point cloud data reception device includes, for example, an LOD selector 17000, a geometry decoder 17001, and/or an attribute decoder 17002.

The LOD selector 17000 receives a bitstream containing point cloud data. The bitstream may represent, for example, an interleaved bitstream generated by the bitstream interleaver 16004 described with reference to FIG. 16. The interleaved bitstream may contain, for example, only point cloud data corresponding to an LOD of level n. That is, the interleaved bitstream may include a geometry bitstream and an attribute bitstream in order of R0-G, R0-A, R1-G, R1-A, . . . , Rn-G, and Rn-A.

The LOD selector 17000 may select a reference of a detail for decoding by the reception device according to the embodiments. For example, when the reception environment of the reception device is not good, the LOD selector 17000 may select a low level LOD. For example, when the reception environment of the reception device is good, the LOD selector 17000 may select a high level LOD.

For example, when the reception environment of the reception device is not good and the LOD selector 17000 performs decoding only up to an LOD of level 3, it may receive and decode the reception bitstream only for R0-G, R0-A, R1-G, R1-A, R2-G, R2-A, R3-G, and R3-A among R0-G, R0-A, R1-G, R1-A, . . . , Rn-G, and Rn-A. In this case, the decoding performed by the point cloud data decoder according to the embodiments may be referred to as partial geometry decoding.

For example, when the reception environment of the reception device is good and the LOD selector 17000 performs decoding only up to the LOD of level 3, it may receive the entire reception bitstream for R0-G, R0-A, R1-G, R1-A, . . . , Rn-G, and Rn-A and decode the same. In this case, the decoding performed by the point cloud data decoder according to the embodiments may be referred to as full geometry decoding.

According to embodiments, when the reception environment of the reception device is good, but the encoding environment of the transmission device is not good, the LOD selector 17000 may receive a bitstream corresponding to LODs only up to the LOD of level 3. In this case, the selector may receive the reception bitstream for all of R0-G, R0-A, R1-G, R1-A, R2-G, R2-A, R3-G, and R3-A and fully decode the same.

On the other hand, when the reception environment of the reception device is not good and the encoding environment of the transmission device is not good, the reception device may receive a bitstream corresponding to LODs only up to the LOD of level 2 although the transmission device has transmitted a bitstream corresponding to LODs up to the LOD of level 3. In this case, the reception device may receive the reception bitstream only for R0-G, R0-A, R1-G, R1-A, R2-G, and R2-A and decode the same.

The geometry decoder 17001 decodes the geometry bitstream (e.g., R0-G, R1-G, R2-G, etc.) in the bitstream received by the LOD selector 17000 and generates reconstructed geometry data.

The attribute decoder 17002 decodes the attribute bitstream (e.g., R0-A, R1-A, R2-A, etc.) in the bitstream received by the LOD selector 17000 and generates reconstructed attribute data. The attribute decoder 17002 may decode the attribute bitstream based on the reconstructed geometry data.

The reception device according to embodiments may achieve scalable point cloud presentation by selecting an LOD corresponding to the detail of desired content. For example, in the case where decoding is performed only up to the LOD of level 3 according to the reception environment of the reception device, the reception device may receive only R0-G, R0-G, R0-A, R1-G, R1-A, R2-G, R2-A, R3-G, and R3-A and decode the same to perform rendering.

In addition, the configuration described above may allow the point cloud data reception device according to the embodiments to perform decoding at a high speed in an environment requiring low delay. In addition, the reception device may perform decoding based on the prediction unit group and may perform decoding adaptively to the transmission/reception environment.

Also, according to this configuration, when LoD-based position information predictive coding is performed, the process of separately generating an LOD by the receiver may be omitted, and thus the time required for position information prediction-based decoding and the time required for attribute information prediction-based decoding may be reduced. The method/device for transmitting and receiving point cloud data according to the embodiments may increase compression efficiency of the prediction-based point cloud coding, extend the prediction-based point cloud coding, and provide low delay and scalable effects.

Figure 18:
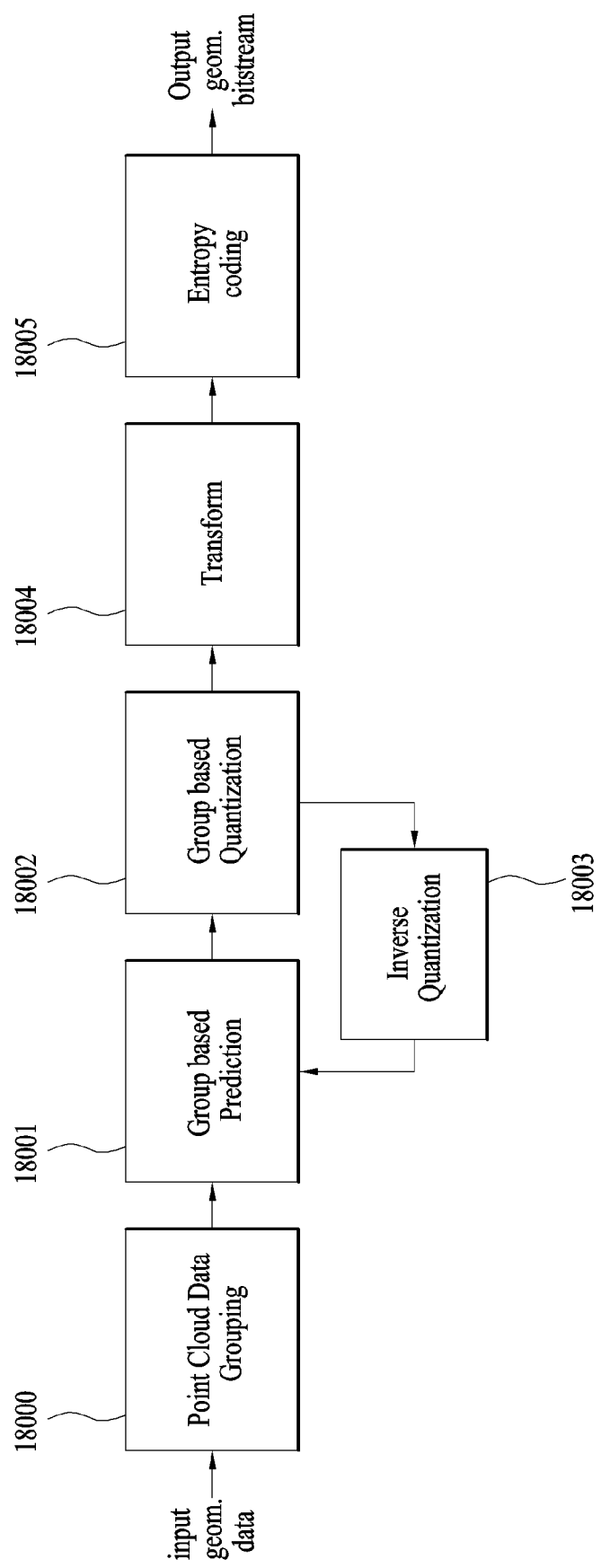
FIG. 18 illustrates a portion of an encoder of a point cloud data transmission device according to embodiments.

FIG. 18 illustrates a portion of an encoder of a point cloud data transmission device according to embodiments.

The encoder of the point cloud data transmission device shown in FIG. 18 may be referred to as a prediction-based geometry encoder, a prediction-based scalable point cloud geometry encoder, or a scalable geometry encoder.

The encoder of the point cloud data transmission device shown in FIG. 18 may represent/include the point cloud video encoder 10002 of FIG. 1, the decoding unit 20001 of FIG. 2, and the components shown in FIG. 12.

The encoder of the point cloud data transmission device shown in FIG. 18 may be included in the robot 1710, the self-driving vehicle 1720, the XR device 1730, the smartphone 1740, the home appliance 1750, the AI server 1760, or the HMD 1770 of FIG. 14.

The prediction-based geometry encoder shown in FIG. 18 may include the geometry quantization voxelization unit 16000, the LOD generator 16002, and the geometry encoder 16003a of FIG. 16.

The prediction-based geometry encoder according to the embodiments may include a point cloud data grouping unit 18000, a group-based prediction unit 18001, a group-based quantization unit 18002, a dequantization unit 18003, a transform unit 18004, and an entropy coding unit 18005.

The point cloud data grouping unit 1800 may perform an operation (grouping) of grouping position (geometry) information for point cloud data on a prediction group basis. The group-based prediction unit 18001 may use, for example, a retained group (or a refined group) defined in dividing the point cloud data based on the LOD as a prediction group. The total number of prediction groups (e.g., the number of retained groups) according to the embodiments may be signaled through num_predgroups.

The grouping operation according to the embodiments will be described in detail with reference to FIGS. 22 to 25.

The group-based prediction unit 18001 performs a prediction process for each of points grouped by the point cloud data grouping unit 18000. The prediction process includes generating a prediction tree by searching for a parent, which is correlated data about each point, for each group, and predicting the geometry information about each point based on the prediction tree according to a prediction method. The prediction process includes generating residual information for each group (or for all groups) from the predicted geometry information and actual geometry information (source data) about each point.

Detailed information about the prediction group used for prediction may be signaled to the reception device by signaling information of group_ref_mod, num_ref_groups, and ref_index, and parameters required to perform prediction according to the prediction method may be signaled to the reception device by information of pred_method, pred_param_a, and pred_param_b. A method for performing prediction will be described in detail with reference to FIG. 26.

The group-based quantization unit 18002 quantizes prediction-related information predicted and generated for each group. The transform unit 18004 transforms the quantized geometry data. The entropy coding unit 18005 encodes the transformed geometry data. The quantization unit 18002 represents the quantization and point removal (voxelization) unit 40001 of FIG. 4 and the quantization processor 12001 and the voxelization processor 12002 of FIG. 12. The transform unit 18004 may perform the operation of the coordinate transformer 40000 of FIG. 4. The operation of the surface model processor 12004 of FIG. 12 may be performed. The entropy coding unit 18005 may represent the arithmetic encoder 40004 of FIG. 4 and the arithmetic coder 12006 of FIG. 12.

Such operations may allow the reception device according to the embodiments to achieve scalable point cloud presentation by selecting an LOD corresponding to the detail of desired content. For example, when decoding is performed only up to LOD level 3 due to the reception environment of the reception device, the reception device may receive only R0-G, R0-A, R1-G, R1-A, R2-G, R2-A, R3-G, and R3-A and decode the same to perform rendering.

In addition, the configuration described above may allow the point cloud data transmission device according to the embodiments to perform encoding at a high speed in an environment requiring low delay. In addition, the transmission device may perform encoding based on the prediction unit group and transmit only unit information required by the reception device, thereby enabling the reception device to adaptively perform decoding in the transmission/reception environment and providing a coding method suitable for the low delay environment. The configuration may also enable the reception device to perform scalable decoding.

Figure 19:
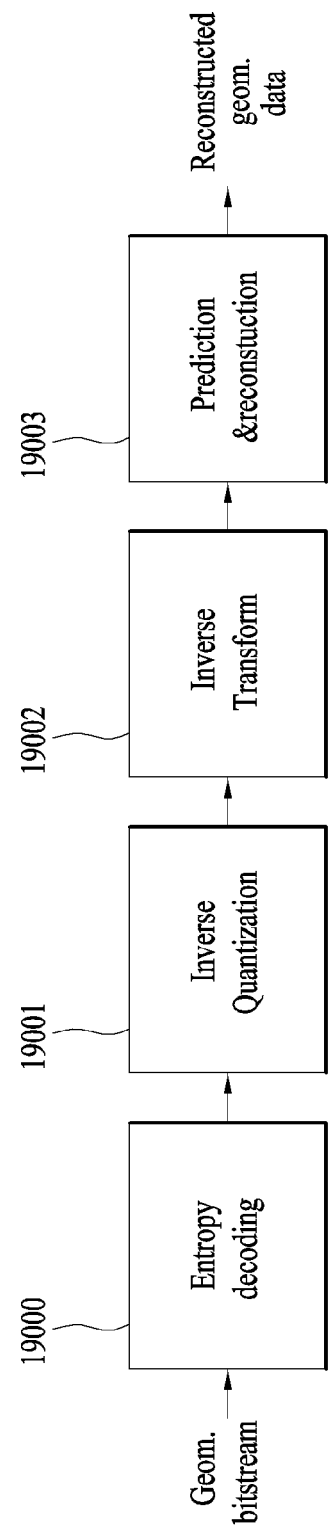
FIG. 19 illustrates a portion of a decoder of a point cloud data reception device according to embodiments.

FIG. 19 illustrates a portion of a decoder of a point cloud data reception device according to embodiments.

The decoder of the point cloud data reception device shown in FIG. 19 may be referred to as a prediction-based geometry decoder, a prediction-based scalable point cloud geometry decoder, or a scalable geometry decoder.

The decoder of the point cloud data reception device shown in FIG. 19 may represent/include the point cloud video decoder 10006 of FIG. 1, the decoding unit 20003 of FIG. 2, and the components shown in FIG. 11, and the components shown in FIG. 13.

The decoder of the point cloud data reception device shown in FIG. 19 may be included in the robot 1710, the self-driving vehicle 1720, the XR device 1730, the smartphone 1740, the home appliance 1750, the AI server 1760, or the HMD 1770 of FIG. 14.

The prediction-based geometry decoder shown in FIG. 18 may include the LOD selector 17000, the geometry decoder 17001, and the attribute decoder 17002 of FIG. 17.

The prediction-based geometry decoder according to the embodiments may include an entropy decoding unit 19000, an inverse quantization unit 19001, an inverse transform unit 19002, and a prediction/reconstruction unit 19003. The receiver restores the signal in reverse order of the execution of the transmitter.

The entropy decoding unit 19000 entropy-decodes the received bitstream. The received bitstream may represent geometry data in the received bitstream transmitted by the transmission device and selected by the LOD selector 17000 of the reception device, as described with reference to FIG. 17.

The geometry data may include, for example, geometry information about points corresponding to a specific level of LOD group, or may include geometry information about all points. The geometry data may also include geometry information about a specific point and residual information for position information about the remaining points. That is, the geometry data may include geometry information about a first point, residual information for generating geometry information about a second point (residual information about the positions of the first point and the second point), and residual information for generating geometry information about a third point (residual information about the positions of the second point and the third point).

For example, geometry data may be received for each retained group. As shown in FIG. 17, the geometry data may be received in order of R0-G, R1-G, R2-G, and R3-G for each level.

The geometry data received by the entropy decoding unit 19000 may be geometry data about all points. In this case, the geometry data is arranged in order of R0-G, R1-G, R2-G, R3-G, . . . , and RL-G.

The geometry data received by the entropy decoding unit 19000 may be geometry data for some points. For example, when the data is present for only up to the level 3 LOD, the geometry data is arranged in order of R0-G, R1-G, R2-G, and R3-G.

The inverse quantization unit 19001 inversely quantizes the entropy-decoded received bitstream. The inverse transform unit 19002 may perform inverse transform on the inversely quantized geometry data.

The prediction/reconstruction unit 19003 may predict geometry information about points and reconstruct the same based on the inversely transformed geometry data.

The prediction/reconstruction unit 19003 generates a prediction tree by determining (searching for) a parent-child relationship between points in the received bitstream geometry data. The prediction/reconstruction unit 19003 calculates and predicts geometry information about each point based on the prediction tree, prediction method information (e.g., pred_method) applied to each point, and related parameters (pred_param_a, pred_param_b, etc.).

The prediction/reconstruction unit 19003 may receive residual information about each point in the received bitstream and may supplement the geometry information by adding or subtracting residual information to or from the predicted geometry information about each point.

That is, the prediction/reconstruction unit 19003 may predict and/or reconstruct geometry information about all points (or points corresponding to a specific LOD level) based on position information about a specific point included in the geometry data and residual information about other points.

For example, when the geometry data is geometry data about all points, the inversely transformed geometry data is arranged in order of R0-G, R1-G, R2-G, R3-G, . . . , and RL-G.

R0-G includes geometry information about a specific point (or specific points), and residual information about geometry information about other points except for the specific point(s) among the points corresponding to R0-G. The prediction/reconstruction unit 19003 predicts geometry information about other points based on the geometry information about the specific point according to a prediction method, and reconstructs geometry information about all points by adding or subtracting residual information to or from the predicted geometry information. R1-G and R2-G may also be configured in a similar manner.

According to embodiments, the reception device (or prediction/resconfiguration unit 19003) performs prediction through a group candidate for prediction based on group_ref_mod, num_ref_groups, and ref_index delivered from the transmission device, performs prediction on the candidate based on the information of pred_method, pred_param_a, and pred_param_b, and reconstructs geometry information about points based on the restored residual value.

According to this configuration, the receiver skips the process of generating prediction group information. Accordingly, the execution time may be significantly reduced compared to that in the transmitter. The execution time may be further reduced when the prediction process can also be omitted.

A method for predicting geometry information about points by the prediction/reconstruction unit 19003 will be described in detail with reference to FIG. 26.

Figure 20:
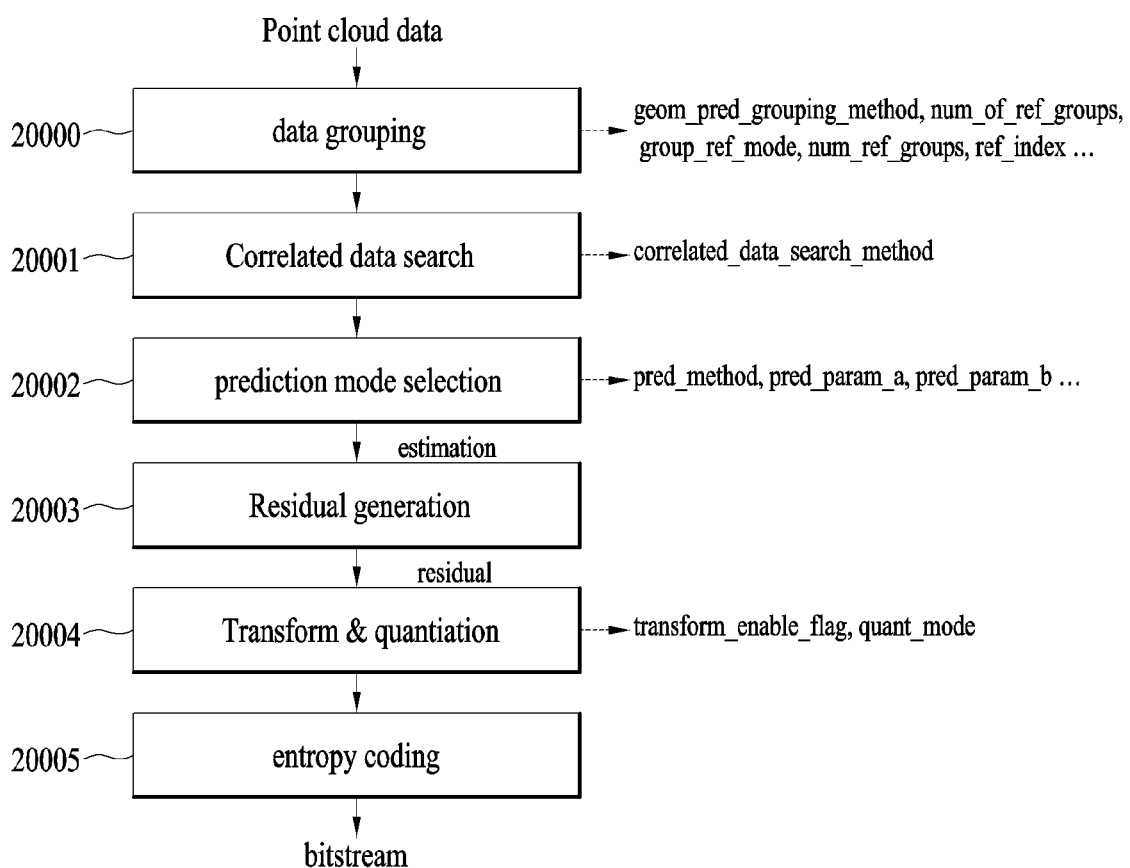
FIG. 20 illustrates a process of encoding geometry data of point cloud data according to embodiments.

FIG. 20 illustrates a process of encoding geometry data of point cloud data according to embodiments.

FIG. 20 illustrates a prediction-based geometry encoding operation. The operation illustrated in FIG. 20 represents the prediction-based geometry encoder shown in FIG. 18, the point cloud data encoder shown in FIG. 16, and the transmission device elements 15001 to 15004 shown in FIG. 15.

The encoding operation of the point cloud data transmission device illustrated in FIG. 20 may be performed in the robot 1710, the self-driving vehicle 1720, the XR device 1730, the smartphone 1740, the home appliance 1750, the AI server 1760, or the HMD 1770 of FIG. 14.

The prediction-based geometry encoding includes data grouping 20000, correlated data search 20001, prediction mode selection 20002, residual information generation 20003, transform and quantization 20004, and/or entropy coding 20005.

In the data grouping 20000, the acquired point cloud data is grouped by a specific method according to embodiments.

In the data grouping 20000, one or more prediction unit groups may be generated using a grouping method based on a distance between points. Various grouping methods may be used. For example, the method for generating a prediction group may include a method for generating an LOD group based on the distance between points as a prediction unit group, a method for generating an LOD group based on octree sampling as a prediction unit group, and a method for generating a prediction unit group with region-based adjacent points. In the data grouping 20000, the prediction unit grouping method (e.g., geom_pred_grouping_method information) may be signaled to the reception device.

In the data grouping 20000, information (e.g., group_ref mode information) indicating a method for determining a candidate of the prediction unit group used for prediction, information indicating the number of prediction unit groups used for prediction (e.g., num_ref_groups), and information indicating an index (identifier) of a prediction unit group used for prediction (e.g., ref_index information) may be further signaled.

In the correlated data search 20001, the grouped point cloud data is searched for correlated data for each group. That is, the correlated data search 20001 includes searching for a parent of each of the points in the prediction unit group generated in the data grouping 20000.

The parent of a specific point represents a point serving as a reference when the specific point performs prediction. For example, when a first point is a parent of a second point, geometry information about the second point is predicted based on geometry information about the first point. Accordingly, the geometry information about the second point may be calculated by adding or subtracting residual information about the second point to or from the geometry information about the first point.

The correlated data search 20001 represents the process of searching for a point corresponding to the parent of each point. In other words, a parent-child relationship is established by searching for a point with a high correlation with the current point. As methods for searching for a point corresponding to a parent, a method for searching in input order of points, a method for searching in a time stamp order, a method for searching in order of Morton codes of points, a method for searching in order of radii from the center axis of LiDAR, a method for searching in order of horizontal angles from the LiDAR center axis, and a method for searching in order of vertical angles of the LiDAR may be defined.

In the correlated data search 20001, a point similar to a compression target is searched for to increase compression efficiency in prediction-based point cloud compression. In order for a specific point to have a parent-child relationship with another point with a high similarity, a method for sorting data in order of adjacency may be used in the correlated data search 20001. For example, in the correlated data search 20001, data of points may be sorted using the nearest neighbor search method, or may be sorted in a Morton code order. Using the sorting method, the correlated data search 20001 may establish a prediction relationship (i.e., a parent-child relationship) between points. The parent-child relationship may be referred to by various terms such as an adjacency relationship or an upper-lower node relationship.

In the correlated data search 20001, sorting may be performed using characteristics of data acquisition. For example, for LiDAR data, data may be acquired in a cylindrical shape through rotation around a central axis. Here, the parent-child relationship (adjacency relationship) according to the embodiments may be determined by searching the cylinder-shaped data for the points in order of distances to at least one of the points (e.g., distances from the central axis), elevation angles (e.g., heights separated from the center axis) of the points, or azimuth angles of the points (e.g., azimuth angles with respect to the center axis). The operation 20001 of searching for correlated data may further include sorting points to search for the points using the above-mentioned method. In the correlated data search 20001, the order in which the data is arranged may be determined through sorting according to the radius from the center axis, the angle in the height direction (e.g., elevation), or the angle in the horizontal direction (azimuth). The center axis may be, for example, a center axis of a bounding box containing point cloud data, or may represent a position where a specific point is placed.

When a neighbor point (correlated data) for the current point is determined, the parent-child relationship between the current point and the correlated data may be determined. In this case, the parent of the parent is a grand parent of the corresponding point, that is, the child. When the process of configuring neighbor points is performed, all points are connected through the child-parent relationship, and each point may be referred to as a vertex.

In the correlated data search 20001, a method for searching for a point corresponding to a parent (e.g., correlated_data_search_method information) may be signaled to the reception device for each point, each group, or the entire point cloud data.

In the correlated data search 20001, a parent-child relationship may be established for all points, and one or more prediction trees in which a parent-child relationship is established may be generated for all points.

The prediction tree may represent, for example, a tree shown or described in FIGS. 23 to 26.

In the prediction mode selection 20002, a method by which points in prediction unit groups are predicted from geometry information about the points is selected. That is, the optimal prediction method is searched for based on the parent and the points related to the parent. The prediction method may be signaled by prediction_method. In the prediction mode selection 20002, after selecting the prediction method (or prediction mode), predicted geometry information is calculated for each point. The prediction methods may be configured as follows.
1) Method 1 (pred_method=0): V'(p)=a*V(p−1)+b
2) Method 2 (pred_method=1): V'(p)=(a+1) V(p−1)−a*V(p−2)+b
3) Method 3 (pred_method=2): V'(p)=(a−1)*V(p−1)+a*V(p−2)+2b
4) Method 4 (pred_method=3): V'(p)=V(p−1)+a*V(p−2)−a*V(p−3)+b
5) Method 5 (pred_method=4): V'(p)=(a−1)*V(p−1)+(a−1)*V(p−2)+a*V(p−3)+3b
6) Method 6 (pred_method=5): V'(p)=V(p−1)+(a−1)*V(p−2)+a*V(p−3)+a*V(p−4)+3b
7) Method 7 (pred_method=6): V'(p)=(a+2) V(p−1)−(2a+1)*V(p−2)+a*V(p−3)+b Here, V(p) may represent the p-th point (vertex), V(p−1) may be defined as a parent of V(p), and V(p−2) may be defined as a parent of V(p−1), that is, a grand parent of V(p). Also, a and b may be transmitted to the reception device by information (pred_param_a and pred_param_b) signaled by the transmission device. V'(p) denotes predicted geometry information about the point p. Details related thereto will be described with reference to FIG. 26.

In the residual generation 20003, a residual for each point is generated based on the predicted geometry information about each point generated in the prediction mode selection 20002 and the actual geometry information about each point. The residual information may subtract or add the predicted geometry information about the point predicted in the prediction mode selection 20002 from or to the actual geometry information about the point. That is, the residual information represents a difference between the source data and the predicted data.

A method for calculating the residual information for point p according to each prediction method may be configured as disclosed below (E denotes the residual for point p).
1) Method 1 (pred_method=0): E=[V(p)−a V(p−1)−b]
2) Method 2 (pred_method=1): E={[V(p)−V(p−1)]−a*[V(p−1)−V(p−2)]−b}
3) Method 3 (pred_method=2): E={[V(p)+V(p−1)]/2−a*[V(p−1)+V(p−2)]/2−b}
4) Method 4 (pred_method=3): E={[V(p)−V(p−1)−a*V(p−2)−[V(p−3)]−b}
5) Method 5 (pred_method=4): E={[V(p)+V(p−1)+V(p−2)]/3−a*V(p−1)+V(p−2)+V(p−3)]/3−b}
6) Method 6 (pred_method=5): E={[V(p)+V(p−1)+V(p−2)]/3−a'*[V(p−2)+V(p−3)+V(p−4)]/3−b'}
7) Method 7 (pred_method=6): E={[V(p)−2V(p−1)+V(p−2)]−a*[V(p−1)−2V(p−2)+V(p−3)]−b}

The residual information about each point according to the embodiments may be included in a bitstream and transmitted to the reception device.

In the transform and quantization 20004 and/or the entropy coding 20005, geometry information about a specific point and/or residual information about the remaining points are transformed and/or quantized, and entropy-coded according to embodiments.

The encoder of the point cloud data transmission device according to the embodiments may establish an adjacency relationship between a first point (the current point) and a second point (an adjacent point) among the points for the point cloud data based on a plurality of groups (prediction groups) configured through grouping. For example, the encoder of the point cloud data transmission device according to the embodiments may generate a predicted value for the first point (the current point) based on the first point (the current point) and the second point (the adjacent point). Here, the second point may be a point corresponding to the parent node (parent) of the first point.

The encoder of the point cloud data transmission device according to parent embodiments may predict geometry data about all points (except for a node corresponding to a root node) of the point cloud data, or may predict geometry data about only some points. For example, for lossless data, the encoder may search for an adjacency relationship for all points of the point cloud data (except for the node corresponding to the root node) and predict geometry data. For example, for lossy data, the encoder may search for an adjacency relationship for only some points and predict geometry data.

This operation may allow the reception device according to the embodiments to achieve scalable point cloud presentation by selecting an LOD corresponding to the detail of desired content. For example, when decoding is performed only up to LOD level 3 due to the reception environment of the reception device, the reception device may receive only R0-G, R0-A, R1-G, R1-A, R2-G, R2-A, R3-G, and R3-A and decode the same to perform rendering.

In addition, the configuration described above may allow the point cloud data transmission device according to the embodiments to perform encoding at a high speed in an environment requiring low delay. In addition, the transmission device may perform encoding based on the prediction unit group and transmit only unit information required for the reception device, thereby enabling the reception device to adaptively perform decoding in the transmission/reception environment and providing a coding method suitable for the low delay environment. The configuration may also enable the reception device to perform scalable decoding.

Figure 21:
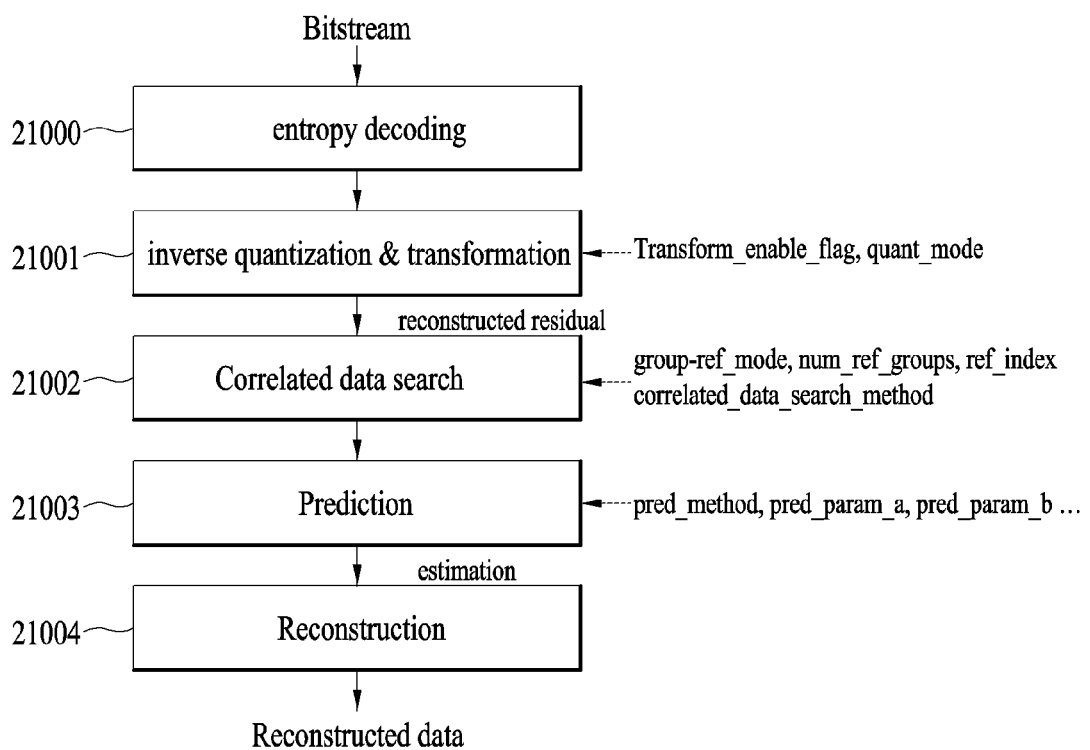
FIG. 21 illustrates a process of decoding geometry data of point cloud data according to embodiments.

FIG. 21 illustrates a process of decoding geometry data of point cloud data according to embodiments.

FIG. 21 illustrates a prediction-based geometry decoding operation. The operation illustrated in FIG. 21 represents the prediction-based geometry decoder shown in FIG. 19, the point cloud data decoder shown in FIG. 17, and the reception device elements 15004 to 15006 shown in FIG. 15.

The decoding operation of the point cloud data reception device illustrated in FIG. 21 may be performed in the robot 1710, the self-driving vehicle 1720, the XR device 1730, the smartphone 1740, the home appliance 1750, the AI server 1760, or the HMD 1770 of FIG. 14.

The prediction-based geometry decoding includes entropy decoding 21000, inverse quantization and transformation 21001, correlated data search 21002, prediction 21003, and/or point cloud data reconstruction 21004.

In the entropy decoding 21000, encoded geometry data contained in the received bitstream according to the embodiments is entropy-decoded. The entropy decoding 21000 may include the operations of the point cloud video decoder 10006 of FIG. 1, the decoding unit 20003 of FIG. 2, the geometry decoder of FIG. 10, the arithmetic decoder 11000 of FIG. 11, the arithmetic decoder 13002 of FIG. 13, the decoders 15006*a* and 15006*b* of FIG. 15, and the geometry coder 16003*a* of FIGS. 16 and 17.

The entropy decoding 21000 may include the operation of the entropy decoding unit 19000 of FIG. 19. That is, the received bitstream is entropy-decoded. The received bitstream may contain, for example, geometry information about points corresponding to LOD groups up to an LOD group of a specific level, or geometry information about all points. The received bitstream may also contain geometry information about a specific point and residual information related to positon information about the remaining points.

In the inverse quantization and transformation 21001, the received bitstream is inversely quantized and/or inversely transformed. In the inverse quantization and transformation 21001, the encoded geometry data contained in the received bitstream may be inversely quantized based on the mode (e.g., quant_mode information) in which the encoded geometry data contained in the received bitstream is quantized. In the inverse quantization and transformation 21001, the inverse transform may be performed based on a flag (e.g., transform_enable_flag) indicating whether the point cloud data transmission device according to the embodiments has transformed the geometry data.

In the inverse quantization and transformation 21001, residual information, which is a prediction error for each point, is restored from the received bitstream.

Description of quant_mode information and transform_enable_flag will be provided with reference to FIG. 29.

In the correlated data search 21002, a parent of a specific point is searched for within the received bitstream. In the correlated data search 21002, the parent of a specific point is searched for based on grouping information and/or information related to the correlated data search method. The grouping information may represent, for example, information indicating a prediction unit group generation method (e.g., geom_pred_grouping_method) signaled to the reception device, information indicating a method for determining a candidate of a prediction unit group (e.g., group_ref mode), information indicating the number of prediction unit groups used for prediction (e.g., num_ref_groups), and information indicating an index (identifier) of a prediction unit group used for prediction (e.g., ref_index).

The parent of the specific point represents a point serving as a reference when the specific point performs prediction. For example, when a first point is the parent of a second point, geometry information about the second point is predicted based on geometry information about the first point. Accordingly, the geometry information about the second point may be calculated by adding or subtracting residual information about the second point to or from the geometry information about the first point.

The correlated data search 20001 represents the process of searching for a point corresponding to the parent of each point. In other words, a parent-child relationship is established by searching for a point with a high correlation with the current point. Methods for searching for a point corresponding to a parent may be the same as those described in the correlated data search 20001 of FIG. 20.

In the correlated data search 20001, a parent-child relationship may be established for all points, and one or more prediction trees in which a parent-child relationship is established may be generated for all points. The parent-child relationship may be referred to by various terms such as an adjacency relationship or an upper-lower node relationship.

The prediction tree may represent, for example, a tree shown or described in FIGS. 23 to 26.

In the prediction 21003, prediction may be performed on all points (or nodes in the prediction tree) by adding or subtracting residual information to or from the parent of each point.

For example, when the parent of a first point is a second point, in the prediction 21003, residual information related to geometry information about the first point and geometry information about the second point are received or generated, and are added or subtracted to reconstruct the geometry information about the first point.

That is, in the prediction 21003, the geometry information about the root node in the prediction tree is received. In prediction 21003, residual information about the child node(s) of the root node is received. In the prediction 21003, the geometry information about the child node(s) is reconstructed by performing a prediction operation such as adding or subtracting residual information about the child node(s) to or from the geometry information about the root node.

In the prediction 21003, residual information about the child node (grand child node)(s) of the child nodes is received. In the prediction 21003, the geometry information about the grand child node(s) is reconstructed by performing a prediction operation such as adding or subtracting the residual information about the grand child node(s) to or from the reconstructed geometry information about the child nodes. By repeating this process, the prediction 21003 may reconstruct even the geometry information about the leaf node.

In the prediction 21003, the above-described prediction operation may be performed based on a prediction method according to embodiments. In the prediction 21003 according to the embodiments, a prediction operation to be performed may be determined based on pred_method information. The prediction methods may be configured as follows.

1) Method 1 (pred_method=0): $V'(p)=a*V(p-1)+b$
2) Method 2 (pred_method=1): $V'(p)=(a+1)*V(p-1)-a*V(p-2)+b$
3) Method 3 (pred_method=2): $V'(p)=(a-1)*V(p-1)+a*V(p-2)+2b$
4) Method 4 (pred_method=3): $V'(p)=V(p-1)+a*V(p-2)-a*V(p-3)+b$
5) Method 5 (pred_method=4): $V'(p)=(a-1)*V(p-1)+(a-1)*V(p-2)+a*V(-3)+3b$
6) Method 6 (pred_method=5): $V'(p)=V(p-1)+(a-1)*V(p-2)+a*V(p-3)+a*V(p-4)+3b$
7) Method 7 (pred_method=6): $V'(p)=(a+2)*V(p-1)-(2a+1)*V(p-2)+a*V(p-3)+b$ In the point cloud data reconstruction 21004, geometry data in point cloud data according to embodiments is reconstructed. For example, in the point cloud data reconstruction 21004, the geometry information close to the actual source data may be reconstructed by adding or subtracting the received residual information to or from the predicted geometry information about each point.

The residual information according to the embodiments may have the following relationship with the predicted geometry information about each point.

1) Method 1 (pred_method=0): $E=[V(p)-a*V(p-1)-b]$
2) Second Method (pred_method=1): $E=\{[V(p)-V(p-1)]-a*[V(p-1)-V(p-2)]-b\}$
3) Third method (pred_method=2): $E=\{[V(p)+V(p-1)]/2-a*[V(p-1)+V(p-2)]/2-b\}$
4) Method 4 (pred_method=3): $E=\{[V(p)-V(p-1)]-a*[V(p-2)-V(p-3)]-b\}$
5) Method 5 (pred_method=4): $E=\{[V(p)+V(p-1)+V(p-2)]/3-a*[V(p-1)+V(p-2)+V(p-3)]/3-b\}$,
6) Method 6 (pred_method=5): $E=[V(p)+V(p-1)+V(p-2)]/3-a'*[V(p-2)+V(p-3)+V(p-4)]/3-b'\}$
Method 7 (pred_method=6): $E=\{[V(p)-2V(p-1)+V(p-2)]-a*[V(p-1)-2V(p-2)+V(p-3)]-b\}$ The decoder of the point cloud data transmission device according to the embodiments may predict geometry data about all points (except for a node corresponding to a root node) of the point cloud data, or may predict geometry data about only some points. For example, for lossless data, the decoder may search for an adjacency relationship for all points of the point cloud data (except for the node corresponding to the root node) and predict geometry data. For example, for lossy data, the decoder may search for an adjacency relationship for only some points and predict geometry data.

The method/device for transmitting and receiving point cloud data according to the embodiments may generate and transmit residual information based on this method, thereby increasing compression efficiency of the prediction-based point cloud coding, extending the prediction-based point cloud coding, and providing low delay and scalable effects.

Figure 22:
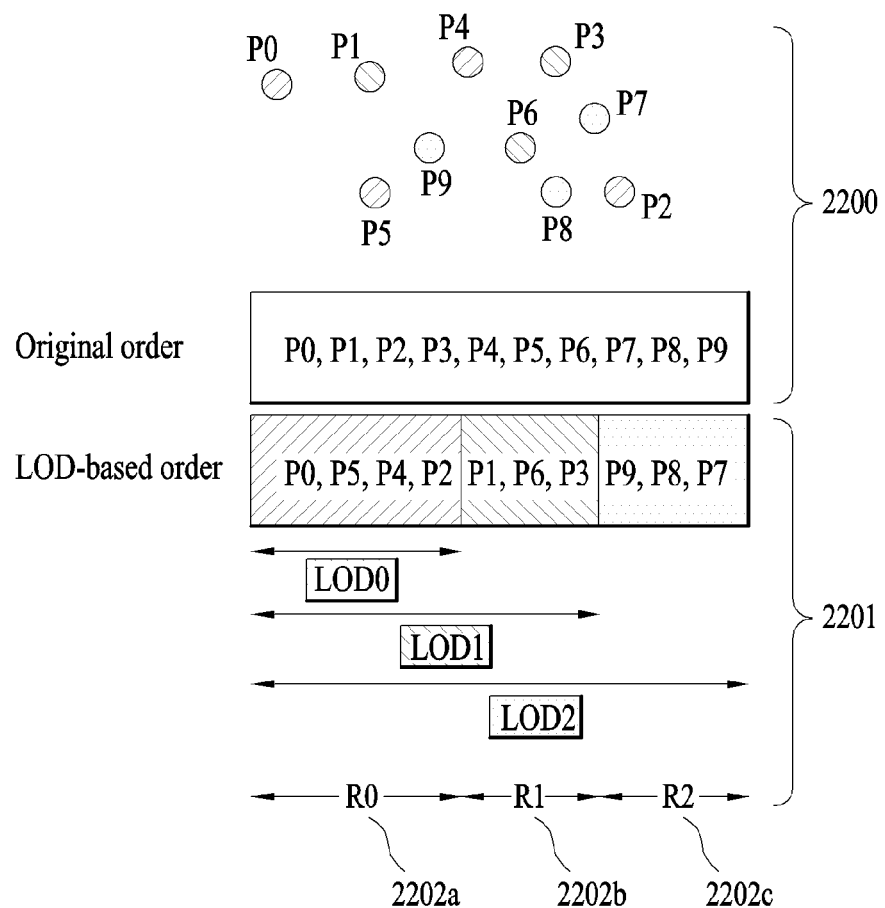
FIG. 22 illustrates a method for grouping points into prediction groups according to embodiments.

FIG. 22 illustrates a method for grouping points into prediction groups according to embodiments.

For example, the grouping method illustrated in FIG. 22 may be carried out in the data grouping 20000 of FIG. 20 by the point cloud data grouping unit 18000 of FIG. 18, the LOD generator 16002 of FIG. 16, or the geometry encoder 15003 of FIG. 15.

For example, the grouping method illustrated in FIG. 22 may be carried out in the prediction 21003 of geometry data of FIG. 21 by the prediction/reconstruction unit 19003 of FIG. 19, the LOD generator 17000 of FIG. 17, or the decoder 15006 of FIG. 15.

The point cloud data includes one or more points (2200). As shown in FIG. 22, the point cloud data has an identifier for each point (e.g., P1 to P9). The point cloud data transmission device encodes geometry data including position information about each point and attribute data including attribute information about each point and transmits the same to the reception device.

In the figure, part 2200 shows the distribution of points and the acquisition (or sorting) order of the points.

Part 2201 shows that points are sorted in level-of-detail (LOD) order and grouping is performed in LOD order.

The grouping operation illustrated in part 2201 may be included in, for example, the data grouping operation 20000 of FIG. 20, and may be performed by the point cloud data grouping unit 18000 of FIG. 18 or the LOD generator 16002 of FIG. 16. For example, the grouping operation illustrated in part 2201 may be included in the geometry data prediction 21003 of FIG. 21, and performed by the prediction/reconstruction unit 19003 of FIG. 19, the LOD generator 17000 of FIG. 17, or the decoder 15006 of FIG. 15.

The grouping operation illustrated in FIG. 22 configures LODs of points based on the geometry data according to the embodiments. The grouping operation generates an LOD group and/or a refined group by classifying the points according to the LODs. According to embodiments, the refined group may be referred to as a retained group.

The LOD refers to a set of points spaced apart by a shorter distance than a sampling distance corresponding to each LOD level. That is, the LOD group L(k) includes a set of points spaced apart by a shorter distance than the sampling distance corresponding to the level of the LOD group. The definition of the LOD group has been described with reference to FIG. 16.

The group with the longest distance between points constitutes LoD0, the group with the middle distance constitutes LoD1, and the group with the shortest distance (high detail) between points, including all points, constitutes LoD2. Retained data groups (or retained groups), which are groups of data newly included to configure LODs, may be considered as independent units, and may be referred to as R0, R1, and R2 depending according to the level.

A retained group R(k) represents groups of points corresponding to a difference between the LOD of a current level and the LOD of the next level for each level.

When the set of the entire point cloud data is N, the LoD and retained data groups may have the following relationship.

$R(0) = LoD(0)$ $R(k) = L(k) \backslash L(k-1) = L(k) \cap L(k-1)^c$ $R0 \cup R1 \cup \ldots \cup Rn = N$ The LOD group according to the embodiments may be generally applied even when another LOD generation method (octree sampling-based method) or a general group generation method is used.

FIG. 22 shows a retained group R0 2202a of level 0 generated as a level 0 LOD group, level 1 a retained group R1 (2202b) of level 1 generated through a difference between the level 1 LOD group and the level 0 LOD group, and a level 2 retained group R2 (2202c) generated through a difference between the level 2 LOD group and the level 1 LOD group.

The point cloud data transmission device and/or reception device according to the embodiments may generate an LOD in various ways. For example, generation of the LOD may be operated as follows.

For example, the grouping operation may reconstruct a set of refinement levels $(R_l)_{l=0 \ldots L-1}$ (where the set of refinement levels may mean a retained group for each level) for the points according to a set of distances $(d_l)_{l=0 \ldots L-1}$ (e.g., manhattan L1 distance). Here, l denotes a current level, and L denotes a level of the maximum LOD (or a level of the maximum refinement set). The set of distances (manhattan distances) may be set by the user or may be determined by the system.

That is, in the operation of generating LODs, an LOD group (LOD set) or a refined group (or a retained group) may be generated based on a distance (e.g., a manhattan L1 distance) at which the points are spaced apart.

For example, the distance $(d_l)_{l=0 \ldots L-1}$ has the following conditions.

1) $d_l < d_{l-1}$
2) $d_{L-1} = 0$

For example, the grouping operation may generate a retained group and/or an LOD group by the following operation. The grouping operation may be performed by the transmission device or may be performed in the reception device according to embodiments.

1) First, all points are marked as non-visited, and a set of visited points (e.g., defined as V) is defined as a null set.
2) The algorithm proceeds iteratively. In the 1-th iteration, the refinement level $R_l$ is generated as follows.
2-1) The algorithm is iterated for all points.
2-2) When the current point is visited, the point is ignored.
2-3) When the current point is not visited, the minimum distance D of the current point is calculated for the V set.
2-4) When D is less than $d_l$, the point is ignored.
2-5) When D is greater than or equal to $d_l$, the point is marked as visited and added to the refinement level set $R_l$ and V simultaneously.
2-6) This process is repeated until all points are traversed.
3) LOD_l is generated by taking the union of a set of refinement levels (R_0, R_1, R_2, ..., R_l) lower than or equal to the corresponding level.
4) This process is repeated until all LODs are generated or all vertices are visited.

The point cloud data transmission/reception method/device according to the embodiments may increase compression efficiency of prediction-based point cloud coding, extend prediction-based point cloud coding, and provide low latency and scalable effects by generating and transmitting residual information based on this method.

Figure 23:
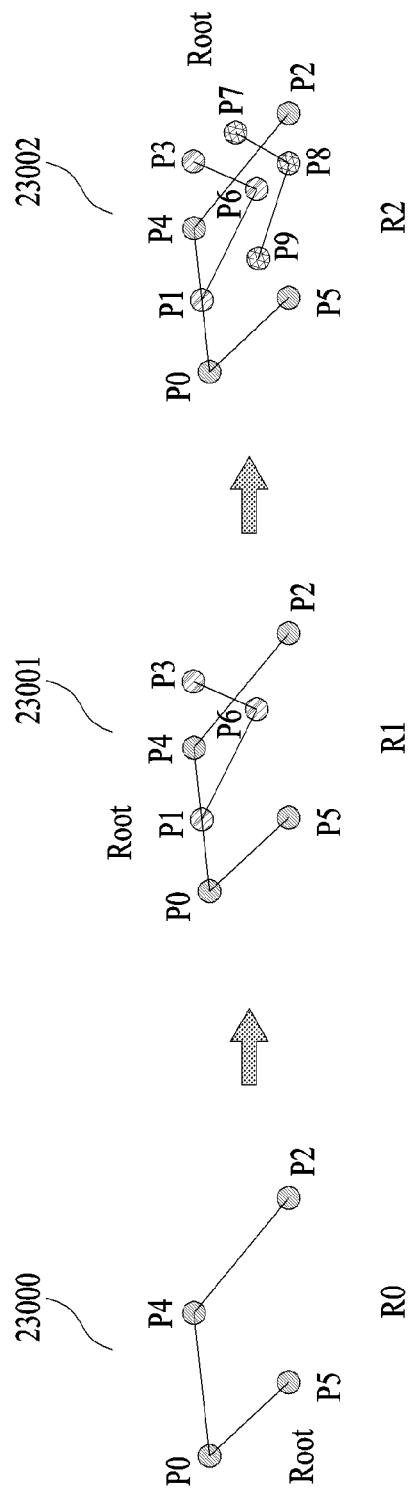
FIG. 23 illustrates a method for grouping points according to embodiments.

FIG. 23 illustrates a method for grouping points according to embodiments.

Specifically, FIG. 23 illustrates a grouping operation according to embodiments and determining a parent-child relationship between points based on geometry information about points in the grouped prediction unit groups.

For example, the operation illustrated in FIG. 23 may be performed in the correlated data search 20001 of FIG. 20 by the group-based prediction unit 18001 of FIG. 18, the geometry encoder 16003a of FIG. 16, or the geometry encoder 15003 of FIG. 15.

For example, the operation illustrated in FIG. 23 may be performed in the correlated data search 21002 or the prediction 21003 of FIG. 21 by the prediction/reconstruction unit 19003 of FIG. 19, the LOD generator 17000 or the geometry decoder 17006 of FIG. 17, or the decoder 15006 of FIG. 15.

The point cloud data transmission device according to the embodiments may separately determine a parent-child relationship between points for each retained group according to the embodiments based on geometry information about points in the grouped prediction unit groups.

A retained data group is a set of data newly included in each LOD group. There is no shared data between the retained data groups. Accordingly, the encoder according to the embodiments may perform prediction between the points in the retained data group.

In FIG. 23, a parent-child relationship of points in the retained group of level k is determined based only on points in the retained group of level k. Referring to FIG. 23, connecting lines represent parent-child relationships.

A method for grouping points based on the distribution of points illustrated in FIG. 23 will be described. For example, the method for grouping points may include operation 23000 of linking parent-child relationships of points in a retained group of level 0, operation 23001 of linking parent-child relationships of points in a retained group to level k−1 (k>1), and operation 23002 of connecting parent-child relationships of points in a retained group of level k.

In operation 23000, the encoder according to the embodiments may determine P5 as a root node. For example, P5 may be determined as the root node because it is the leading point in input order, Morton code order, or time order.

Since P0 among the points in the retained group of level 0 is close to P5 among the points P5, P4, and P2 in the same group, P5 may be determined as a parent.

Since P4 among the points in the retained group of level 0 is close to P0 among the points P5, P0, and P2 in the same group, P0 may be determined as a parent.

Since P2 among the points in the retained group of level 0 is close to P4 among the points P5, P4, and P0 in the same group, P4 may be determined as a parent.

The encoder according to the embodiments may determine a point for which a parent/child relationship is to be determined first among the points P0, P2, and P4, and a point for which a parent/child relationship is to be determined next, that is, the order of determination according to various methods (e.g., input order, Morton code order, time order, etc.).

When there is no point for which any parent-child relationship is not determined in the retained group, the points in the retained group of the next level are searched.

In operation 23001, the encoder according to the embodiments may determine P1 as a root node. Similarly, P1 may be determined as the root node because it is the leading point in input order, Morton code order, or time order.

Since P6 among the points in the retained group of level 1 is close to P1 among the points P1 and P3 in the same group, P1 may be determined as a parent.

Since P3 among the points in the retained group of level 1 is close to P6 between the points P1 and P6 in the same group, P6 may be determined as a parent.

The encoder according to the embodiments may determine a point for which a parent/child relationship is to be determined first between of P6 and P3, and a point for which a parent/child relationship is to be determined later, that is, the order of determination according to various methods (e.g., input order, Morton code order, time order, etc.)

Where there is no point (node) for which any parent-child relationship is not determined in the retained group, the points in the retained group of the next level are searched.

In operation 23002, the encoder according to the embodiments may determine P7 as a root node. Similarly, P7 may be determined as the root node because it is the leading point in input order, Morton code order, or time order.

Since P8 among the points in the retained group of level 2 is close to P7 between the points P7 and P9 in the same group, P7 may be determined as a parent.

Since P9 among the points in the retained group of level 2 is close to P8 between the points P7 and P8 in the same group, P8 may be determined as a parent.

The encoder according to the embodiments may determine a point for which a parent/child relationship is to be determined first between points P8 and P9 and a point for which a parent/child relationship is to be determined later, that is, the order of determination according to various methods (e.g., input order, Morton code order, time order, etc.)

The encoder according to the embodiments may perform the above-described operation equally for level 2 or higher levels. When there is no point (node) for which any parent-child relationship is not determined in the retained group, the points in the retained group of the next level are searched.

In this process, the encoder according to the embodiments may determine a parent-child relationship for all or part of the points. That is, the encoder generates a tree including points and a root node for which the parent-child relationship is determined, and performs the prediction operation according to the embodiments based on the generated tree. The generated tree may be referred to as, for example, a predictive tree. The parent-child relationship may be referred to by various terms such as an adjacency relationship and an upper-lower node relationship.

The encoder according to the embodiments may perform prediction and encoding based on a retained data group according to the method illustrated in FIG. 23, thereby ensuring independence between groups and minimizing data loss.

Figure 24:
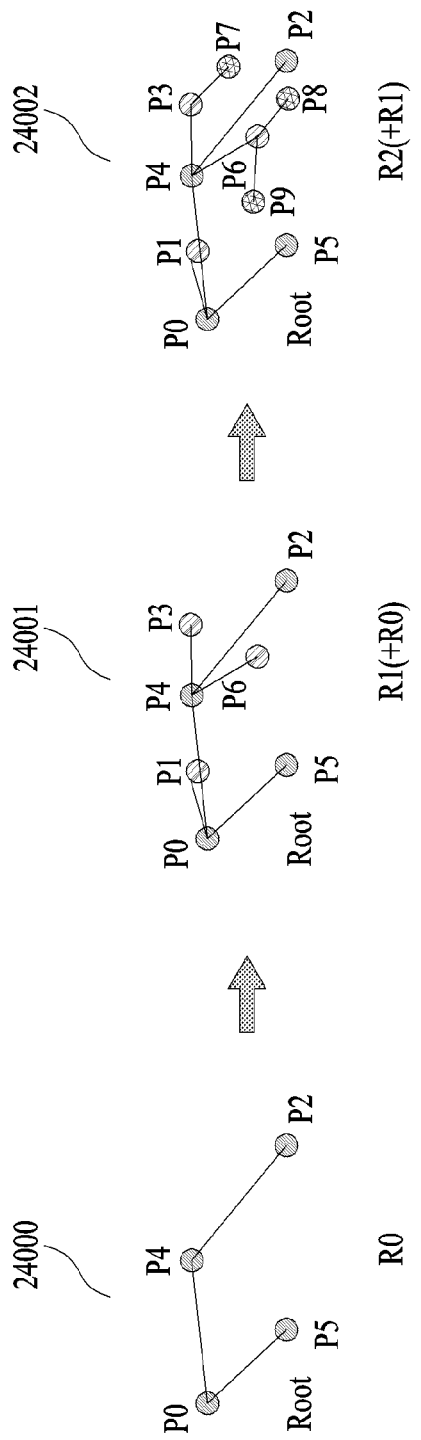
FIG. 24 illustrates a method for grouping points according to embodiments.

FIG. 24 illustrates a method for grouping points according to embodiments.

Specifically, FIG. 24 illustrates a grouping operation and determining a parent-child relationship between points based on geometry information about points in the grouped prediction unit groups according to embodiments.

For example, the operation illustrated in FIG. 24 may be performed in the correlated data search 20001 of FIG. 20 by the group-based prediction unit 18001 of FIG. 18, the geometry encoder 16003a of FIG. 16, or the geometry encoder 15003 of FIG. 15.

For example, the operation illustrated in FIG. 24 may be performed in the operation of the correlated data search 21002 or the prediction 21003 of FIG. 21 by the prediction/reconstruction unit 19003 of FIG. 19, the LOD generator 17000 or the geometry decoder 17006 of FIG. 17, or the decoder 15006 of FIG. 15.

The point cloud data transmission device according to the embodiments may determine a parent-child relationship of points in a retained group of a specific level based on the points in the retained group for a predetermined range of levels.

For example, in FIG. 24, a parent-child relationship of points in the retained group of level k is determined based only on the points in the retained group of level k−1.

A method for grouping points based on the distribution of points illustrated in FIG. 24 will be described. For example, the method for grouping points may include operation 24000 of linking parent-child relationships of points in a retained group of level 0, operation 24001 of linking parent-child relationships of points in a retained group of level k−1 (k>1), and operation 24002 of linking parent-child relationships of points in a retained group to level k.

In operation 24000, the encoder according to the embodiments may determine P5 as a root node. For example, P5 may be determined as the root node because it is the leading point in input order, Morton code order, or time order.

Since P0 among the points in the retained group of level 0 is close to P5 among the points P5, P4, and P2 in the same group, P5 may be determined as a parent.

Since P4 among the points in the retained group of level 0 is close to P0 among the points P5, P0, and P2 in the same group, P0 may be determined as a parent.

Since P2 among the points in the retained group of level 0 is close to P4 among the points P5, P4, and P0 in the same group, P4 may be determined as a parent.

The encoder according to the embodiments may determine a point for which a parent/child relationship is to be determined first among points P0, P2, and P4, and a point for which a parent/child relationship is to be determined next, that is, the order of determination according to various methods (e.g., input order, Morton code order, time order, etc.).

When there is no point for which any parent-child relationship is not determined in the retained group, the points in the retained group of the next level are searched.

In operation 24001, the encoder according to the embodiments may maintain P5 as the root node and search for a parent of points in the retained group of level 1 within the points in the retained group of the previous level (i.e., level 0).

For example, since P1 among the points in the retained group of level 1 is close to P0 among the points P0, P2, P4, and P5 in the retained group of level 0, P0 may be determined as a parent.

Since P3 and P6 among the points in the retarded group of level 1 are close to P4 among the points P0, P2, P4, and P5 in the retained group of level 0, P4 may be determined as a parent.

The encoder according to the embodiments may determine a point for which a parent/child relationship is to be determined first among points P1, P6, and P3, and a point for which a parent/child relationship is to be determined next, that is, the order of determination according to various methods (e.g., input order, Morton code order, time order, etc.).

When there is no point for which any parent-child relationship is not determined in the retained group, the points in the retained group of the next level are searched.

In operation 24002, the encoder according to the embodiments may maintain P5 as the root node and search for a parent of points in the retained group of level 2 within the points in the retained group of the previous level (i.e., level 1).

For example, since P7 among the points in the retained group of level 2 is close to P3 among the points P1, P3, and P6 in the retained group of level 1, P3 may be determined as a parent.

Since P8 and P9 among the points in the retained group of level 2 are close to P6 among the points P1, P3, and P6 in the retained group of level 1, P6 may be determined as a parent.

The encoder according to the embodiments may determine a point for which a parent/child relationship is to be determined first among the points P7, P8, and P9, and a point for which a parent/child relationship is to be determined next, that is, the order of determination according to various methods (e.g., input order, Morton code order, time order, etc.).

The encoder according to the embodiments may perform the above-described operation equally for level 2 or a higher level. When there is no point for which any parent-child relationship is not determined in the retained group, the points in the retained group of the next level are searched.

In this process, the encoder according to the embodiments may determine a parent-child relationship for all or part of the points. That is, the encoder generates a tree including points and a root node for which the parent-child relationship is determined, and performs the prediction operation according to the embodiments based on the generated tree. The generated tree may be referred to as, for example, a predictive tree. The parent-child relationship may be referred to by various terms such as an adjacency relationship and an upper-lower node relationship.

As shown in FIG. 24, the encoder according to the embodiments may perform prediction with reference to points in the retained group of the previous level, or may perform prediction with reference to points in the retained group of a level other than the previous level.

For example, points P7, P8, and P9 in the retained group of level 2 may have a parent as points in the retained group of level 0.

In other words, as a reference group, 1) a preconfigured group (e.g., only the previous group is referenced), 2) n consecutive preceding groups (e.g., three consecutive preceding retained groups, where the encoder may generate signaling information indicating the value of n), or 3) any group (e.g., index of the referenced group may be delivered as 0, 3, 4, or the like) may be used The encoder according to the embodiments may perform prediction and encoding with reference to the retained data group at different levels based on the method illustrated in FIG. 24, thereby improving encoding efficiency for points at a relatively long distance. In addition, as prediction may be performed with one root node, encoding efficiency may be improved. That is, the encoder shares the root node to perform prediction. Accordingly, as predicting is performed based on relatively adjacent points, compression efficiency may be enhanced.

Figure 25:
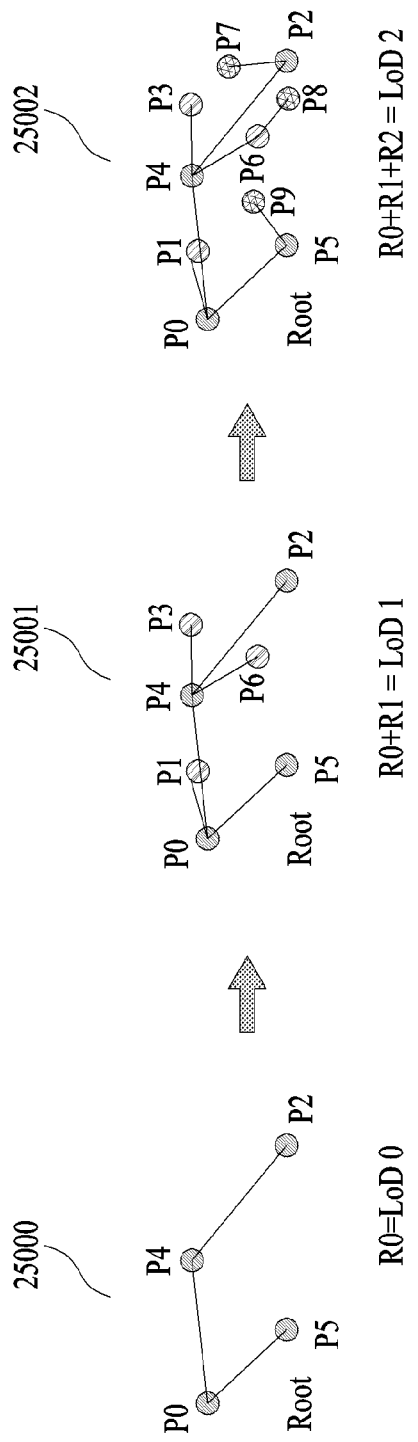
FIG. 25 illustrates a method for grouping points according to embodiments.

FIG. 25 illustrates a method for grouping points according to embodiments.

Specifically, FIG. 25 illustrates a grouping operation and determining a parent-child relationship between points based on geometry information about points in the grouped prediction unit groups according to embodiments.

For example, the operation illustrated in FIG. 25 may be performed in the correlated data search 20001 of FIG. 20 by the group-based prediction unit 18001 of FIG. 18, the geometry encoder 16003a of FIG. 16, or the geometry encoder 15003 of FIG. 15.

For example, the operation illustrated in FIG. 25 may be performed in the operation of the correlated data search 21002 or the prediction 21003 of FIG. 21, and may be performed by the prediction/reconstruction unit 19003 of FIG. 19, the LOD generator 17000 of FIG. 17, or the geometry decoder 17006.

The point cloud data transmission device according to the embodiments may determine a parent-child relationship of points in a retained group of a specific level based on points in the LOD group of the level.

For example, in FIG. 25, a parent-child relationship of points in the retained group of level k is determined based on the points in the LOD group of level k (i.e., the union of the retained groups of level 0 to level k).

A method for grouping points based on the distribution of points illustrated in FIG. 25 will be described. For example, the method for grouping points may include operation 25000 of linking parent-child relationships of points in a retained group of level 0, operation 25001 of linking parent-child relationships of points in a retained group of level k−1 (k>1), and operation 25002 of linking parent-child relationships of points in a retained group to level k.

In operation 25000, the encoder according to the embodiments may determine P5 as a root node. For example, P5 may be determined as the root node because it is the leading point in input order, Morton code order, or time order.

Since P0 among the points in the retained group of level 0 is close to P5 among the points P5, P4, and P2 in the same group, P5 may be determined as a parent.

Since P4 among the points in the retained group of level 0 is close to P0 among the points P5, P0, and P2 in the same group, P0 may be determined as a parent.

Since P2 among the points in the retained group of level 0 is close to P4 among the points P5, P4, and P0 in the same group, P4 may be determined as a parent.

The encoder according to the embodiments may determine a point for which a parent/child relationship is to be determined first among points P0, P2, and P4, and a point for which a parent/child relationship is to be determined next, that is, the order of determination according to various methods (e.g., input order, Morton code order, time order, etc.).

When there is no point for which any parent-child relationship is not determined in the retained group, the points in the retained group of the next level are searched.

In operation 25001, the encoder according to the embodiments may maintain P5 as the root node and search for a parent of points in the retained group of level 2 within the points in the LOD group of the current level (i.e., level 1).

For example, since P1 among the points in the retained group of level 1 is close to P0 among the points P0, P1, P2, P3, P4, P5, and P6 in the LOD group of level 1, P0 may be determined as a parent.

Since P3 and P6 among the points in the retained group of level 1 are close to P4 among the points P0, P1, P2, P3, P4, P5, and P6 in the LOD group of level 1, P4 may be determined as a parent.

The encoder according to the embodiments may determine a point for which a parent/child relationship is to be determined first among points P1, P6, and P3, and a point for which a parent/child relationship is to be determined next, that is, the order of determination according to various methods (e.g., input order, Morton code order, time order, etc.).

When there is no point for which any parent-child relationship is not determined in the retained group, the points in the retained group of the next level are searched.

In operation 25002, the encoder according to the embodiments may maintain P5 as the root node and search for a parent of points in the retained group of level 2 within the points in the LOD group of the current level (i.e., level 2).

For example, since P7 among the points in the retained group of level 2 is close to P2 among the points P1 to P9 in the LOD group of level 2, P2 may be determined as a parent.

Since P8 among the points in the retained group of level 2 is close to P6 among the points P1 to P9 in the LOD group of level 2, P6 may be determined as a parent.

Since P9 among the points in the retained group of level 2 is close to P5 among the points P1 to P9 in the LOD group of level 2, P5 may be determined as a parent.

The encoder according to the embodiments may determine a point for which a parent/child relationship is to be determined first among the points P7, P8, and P9, and a point for which a parent/child relationship is to be determined next, that is, the order of determination according to various methods (e.g., input order, Morton code order, time order, etc.).

The encoder according to the embodiments may perform the above-described operation equally for level 2 or a higher level. When there is no point for which any parent-child relationship is not determined in the retained group, the points in the retained group of the next level are searched.

In this process, the encoder according to the embodiments may determine a parent-child relationship for all or part of the points. That is, the encoder generates a tree including points and a root node for which the parent-child relationship is determined, and performs the prediction operation according to the embodiments based on the generated tree. The generated tree may be referred to as, for example, a predictive tree. The parent-child relationship may be referred to by various terms such as an adjacency relationship and an upper-lower node relationship.

The encoder according to the embodiments may generate signaling information indicating that the entire LODs are used for the prediction operation, as in the prediction method illustrated in FIG. 25, and transmit the same to the reception device.

The method/device for transmitting and receiving point cloud data according to the embodiments may generate and transmit residual information based on this method, thereby increasing compression efficiency of the prediction-based point cloud coding, extending the prediction-based point cloud coding, and providing low delay and scalable effects.

Figure 26:
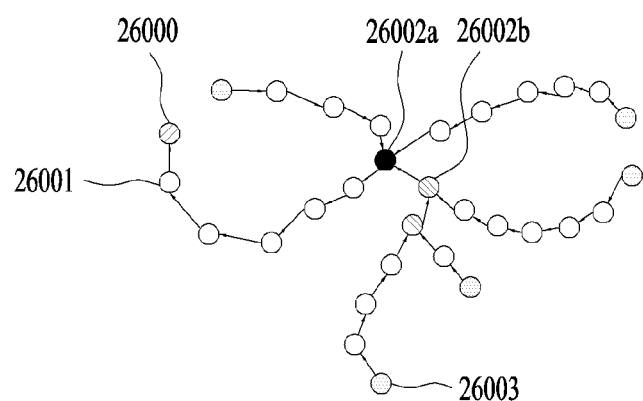
FIG. 26 illustrates a prediction tree according to embodiments.

FIG. 26 illustrates a prediction tree according to embodiments.

The prediction tree according to embodiments shown in FIG. 26 may represent a prediction tree generated by the encoder according to the embodiments in FIGS. 23 to 25. The prediction tree shown in FIG. 26 represents a tree generated by determining a parent-child relationship between points in the correlated data search 20001 illustrated in FIG. 20. The parent-child relationship may be referred to by various terms such as an adjacency relationship or an upper-lower node relationship.

The encoder according to the embodiments predicts geometry information about each point based on the prediction tree shown in FIG. 26.

The prediction tree includes a plurality of nodes corresponding to a plurality of points in order to reconstruct the geometry data about the points. For example, the nodes include a root node 26000 having no parent, and a node having a parent. Nodes having a parent node are referred to as child nodes 26001, 26002a, 26002b, etc. of the parent node. A node having a parent node but does not have a child node is referred to as a leaf node 26001.

The root node 26000 represents a node that does not have a parent. The point cloud data transmission device (encoder) according to the embodiments transmits geometry information about a point corresponding to the root node.

For the root node 26000, there may be one root or a plurality of root nodes. For example, as shown in FIG. 23, when a prediction group is generated based on only the points present in each retained group, the prediction tree has root nodes as many as the number of retained groups. In FIG. 23, since P5, P1, and P7 correspond to the root nodes, the encoder encodes and transmits geometry information about P5, P1, and P7. In the case of FIGS. 24 and 25, the root node is P5, and accordingly the encoder encodes the geometry information about P5

A child node 26001 represents a node having a parent. For example, the node indicated by 26001 is a child node of the root node 26000. A specific node (including the root node) may have one child node, or may have a plurality of child nodes. For example, the node indicated by 26002a has three child nodes. For example, the node indicated by 26002b has two child nodes. For example, referring to FIG. 23, all non-leaf nodes have one child node. In FIG. 24, P4 has three child nodes P2, P3, and P6.

The point cloud data transmission device (encoder) according to the embodiments may predict geometry information about each point based on a prediction method for each point using the generated prediction tree. The prediction method may include the following methods.

1) Method 1 (pred_method=0): $V'(p)=a*V(p-1)+b$
2) Method 2 (pred_method=1): $V'(p)=(a+1) V(p-1)-a*V(p-2)+b$
3) The third method (pred_method=2): $V'(p)=(a-1)*V(p-1)+a*V(p-2)+2b$
4) Method 4 (pred_method=3): $V'(p)=V(p-1)+a*V(p-2)-a*V(p-3)+b$
5) Method 5 (pred_method=4): $V'(p)=(a-1)*V(p-1)+(a-1)*V(p-2)+a*V(p-3)+3b$
6) Method 6 (pred_method=5): $V'(p)=V(p-1)+(a-1)*V(p-2)+a*V(p-3)+a*V(p-4)+3b$
7) Method 7 (pred_method=6): $V'(p)=(a+2) V(p-1)-(2a+1)*V(p-2)+a*V(p-3)+b$ V(p) may be the p-th point (vertex), and V(p−1) may be defined as a parent of V(p), and V(p−2) may be defined as a parent of V(p−1), that is, a grand parent of V(p). Also, a and b may be transmitted to the reception device by information pred_param_a and pred_param_b signaled by the transmission device. V'(p) denotes predicted geometry information about point p.

For example, the encoder of the point cloud data transmission device according to the embodiments may establish an adjacency relationship between a first point (current point) and a second point (adjacent point) among the points for the point cloud data based on a grouped plurality of groups (prediction groups). For example, the encoder of the point cloud data transmission device according to the embodiments may generate a predicted value for the first point (current point) based on the first point (current point) and the second point (adjacent point). Here, the second point may correspond to the parent node (parent) of the first point.

The encoder of the point cloud data transmission device according to the embodiments may predict geometry data about all points (except for a node corresponding to the root node) of the point cloud data, or may predict geometry data about only some points. For example, in the case of lossless data, the encoder may search for adjacency relationships for all points of the point cloud data (except for a node corresponding to the root node) and predict geometry data. For example, in the case of lossy data, the encoder may search for adjacency relationships only for some points and predict geometry data.

The point cloud data transmission device (encoder) according to the embodiments may further generate and transmit residual information for reconstructing or supplementing geometry information about nodes 26001, 26002a, 26002b, 26003, etc., not the root node.

For example, the encoder according to the embodiments may generate a difference between the predicted geometry information and the actual geometry information about each point, that is, a residual, quantize and transform the difference, and transmit the difference to the reception device. The residual means a difference between the source data and the predicted data. A method for calculating a residual for each predicted method (prediction method) for point p may be configured as follows (E denotes residual information about point p)

$$Res(p)=E=V(p)-V'(p)$$

Res(p) denotes residual information about node p that is not the root node. According to this definition, residual information may be determined for each prediction method as follows.

1) Method 1 (pred_method=0): $E=[V(p)-a*V(p-1)-b]$
2) Method 2 (pred_method=1): $E=\{[V(p)-V(p-1)-a*V(p-1)-V(p-2)]-b\}$
3) Method 3 (pred_method=2): $E=\{[V(p)+V(p-1)]/2-a*[V(p-1)+V(p-2)]/2-b\}$
4) Method 4 (pred_method=3): $E=\{[V(p)-V(p-1)]-a*[V(p-2)-V(p-3)]-b\}$
5) Method 5 (pred_method=4): $E=\{[V(p)+V(p-1)+V(p-2)]/3-a*V(p-1)+V(p-2)+V(p-3)]/3-b\}$
6) Method 6 (pred_method=5): $E=\{[V(p)+V(p-1)+V(p-2)]/3-a'*[V(p-2)+V(p-3)+V(p-4)]/3-b'\}$
Method 7 (pred_method=6): $E=\{[V(p)-2V(p-1)+V(p-2)]-a*[V(p-1)-2V(p-2)+V(p-3)]-b\}$ The point cloud data transmission device according to the embodiments may transmit geometry information about the root node, pred_method indicating a prediction method for each point, and/or residual information about each point to the reception device. The transmission device quantizes and/or transforms the geometry information about the root node and residual information about each point and transmits the same to the reception device.

The point cloud data reception device (decoder) according to the embodiments receives the geometry information about the root node 26000 and receives residual information about non-root nodes (e.g., 26001). The reception device (decoder) generates a prediction tree by establishing a parent-child relationship for all points. The parent-child relationship may be referred to by various terms such as an adjacency relationship or an upper-lower node relationship. The reception device (decoder) predicts geometry information about all points based on the generated prediction tree. The reception device (decoder) may perform operations such as adding or subtracting the residual information about each point to or from the predicted geometry information about all points in order to reduce a difference between the predicted geometry information and the actual geometry information about all points.

For the various prediction methods described above, the encoder according to the embodiments may 1) use and/or signal a predetermined prediction method on a basis of a predetermined unit (e.g., slice, coding block, frame, N points, or the like), and 2) provide signaling information about a method for minimizing an error for each point. In addition, the encoder may either 1) use/signal predetermined values for the prediction coefficients a and b, or 2) signal a method a method for minimizing an error for each point.

Accordingly, the encoder according to the embodiments may increase coding efficiency by transmitting a prediction error with respect to the predicted value for the current data.

The point cloud data transmission/reception method/device according to the embodiments may increase compression efficiency of prediction-based point cloud coding, extend the prediction-based point cloud coding, and provide low latency and scalable effects by generating and transmitting residual information based on the above-described method.

Figure 27:
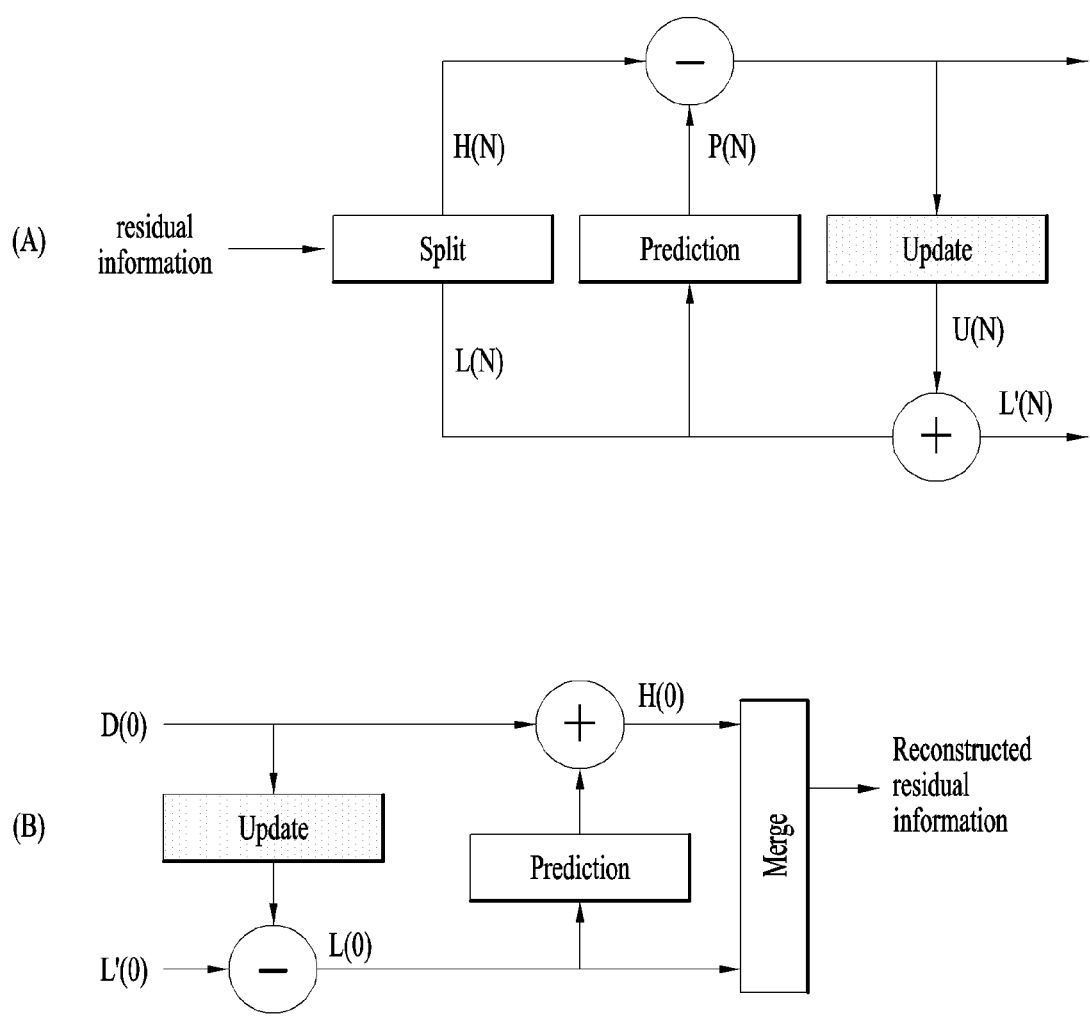
FIG. 27 illustrates a process of transforming/inversely transforming geometry information and/or residual information by a point cloud transmission device and a reception device according to embodiments.

FIG. 27 illustrates a process of transforming/inversely transforming geometry information and/or residual information by a point cloud transmission device and a reception device according to embodiments.

The point cloud data transmission device according to the embodiments may remove redundant information from the residual information through a transform operation. The transform operation may refer to lifting transform.

FIG. 27(A) illustrates an operation of transforming residual information of geometry data about points by a point cloud data transmission device according to the embodiments.

The residual information may represent, for example, the residual information generated in the residual generation operation 20003 of FIG. 20 or the residual information generated in FIG. 26.

The operation of transforming residual information includes splitting the residual information, prediction, and updating. The operation of transforming the residual information removes redundant data within from the residual information according to the embodiments. The transmission device according to the embodiments may generate a corrected first component D(0) and a corrected second component L'(0) after removing redundant data from the residual information for one point.

In the splitting operation, the residual information is received and divided into a first component H(N) and a second component L(N). For example, the splitting may divide the first component and the second component by sampling the residual information, which is input data. According to embodiments, the first component may be referred to as a high frequency component and the second component may be referred to as a low frequency component.

The prediction receives the second component L(N) generated in the splitting operation and generates a predictive component P(N) for correction of the first component H(N) based on the second component. In the prediction operation, the corrected first component D(N) may be generated by subtracting the generated predictive component P(N) from the first component H(N). The corrected first component D(N) may be transmitted or signaled to the reception device.

In the updating, an update component U(N) is generated to supplement/correct the second component L(N). The update component U(N) refers to, for example, a component for supplementing/correcting the second component L(N). In the updating, the corrected second component L'(N) is generated by adding the corrected first component U(N) to the second component L(N).

The transmission device according to the embodiments may perform the operation of the residual information transformation, that is, the residual information splitting, prediction, and updating only once, or may perform the same multiple times (e.g., N times).

For example, the transmission device according to the embodiments may split, predict, and update the corrected second component L'(N).

FIG. 27(B) illustrates an operation of inversely transforming residual information of geometry data about points by a point cloud data reception device according to the embodiments.

The corrected first component D(0) and the corrected second component L'(0) are components for generating residual information about a point.

In the operation of inversely transforming the residual information, the corrected first component D(0) and the corrected second component L' (0) are received. The operation of inversely transforming the residual information may include an update operation, a prediction operation, and/or a merge operation.

In the update operation, the corrected first component D(0) is received and an update component for reconstructing/deriving the second component is generated from the corrected second component L'(0). In the update operation, the second component L(0) is generated by subtracting the generated update component from the corrected second component L' (0).

In the prediction operation, the second component L(0) is received and a prediction component for reconstructing/predicting the first component is generated from the corrected first component D(0). In the prediction operation, the first component H(0) is generated by adding the generated predictive component to the corrected first component D(0).

In the merge operation, the first component H(0) and the second component L(0) may be received and combined to restore the residual information.

The point cloud data transmission device according to the embodiments may further remove redundant data from the residual information according to the embodiments due to this configuration. Accordingly, as the transmission device transmits the residual information obtained by removing redundant data, encoding efficiency may be improved, and unnecessary delay and processing burden on the reception device may be reduced.

The point cloud data reception device according to the embodiments receives redundant data in the residual information according to embodiments due to this configuration. Accordingly, as the reception device receives residual information obtained by removing the redundant data, decoding efficiency may be increased, and point cloud content may be provided to the user adaptively to the decoding environment of the reception device.

The point cloud data transmission device (encoder) according to embodiments may quantize residual information transformed according to the residuals of points, Res(p) and/or FIG. 27(A), and transmit the same to the reception device. In an environment where data loss is acceptable, data may be further reduced through normalization. Here, different quantization values may be applied according to the groups.

For example, by applying a small normalization value to data that is referenced many times, errors caused by predictions may be minimized. For example, when references between prediction groups are possible, a quantization weight may be applied differently depending on the number of times that the prediction group is referenced. In this case, the quantization weight Q0 may be defined to be inversely proportional to the number of times of reference to the prediction group.

Quant[$x$]=FLOOR[Res($p$)/$Q$(referred number of prediction group)]

Here, x denotes the quantized value of the points included in the prediction group, Res(p) denotes the residual information about the points in the prediction group, and Q (referred number of prediction group) denotes the quantized weight for the prediction group.

As another example, the quantization weight Q( ) may be applied differently depending on the referred number of points in the encoding process based on the prediction method. In this case, the quantization weight may be defined to be inversely proportional to the referred number of the point.

Quant[$x$]=FLOOR[Res($p$)/$Q$(referred number of vertex)]

Here, x denotes the quantized value of the points included in the prediction group, Res(p) denotes the residual information about the points in the prediction group, and Q (referred number of vertex) denotes the quantized weight for the point.

As another example, a quantization weight Q( ) may be applied according to the order in which the vertexes are coded from the root node. In this case, when the number of parent-child relationships among the current vertex to the root node (or a certain reference vertex) is defined as a vertex distance, the quantization weight may be defined to be proportional to the vertex distance.

Quant[$x$]=FLOOR[Res($p$)/$Q$(vertex distance from root)]

As another example, the quantization weight Q( ) may be applied differently according to the number of child nodes. In this case, the quantization weight may be defined to be inversely proportional to the number of child nodes.

Quant[$x$]=FLOOR[Res($p$)/$Q$(number of children)]

One or more of the quantization weights described above may be used in combination.

The point cloud data transmission device according to the embodiments may provide fast encoding in an environment in which geometry data loss is allowed due to such transformation and/or quantization operations, and may improve encoding efficiency.

Figure 28:
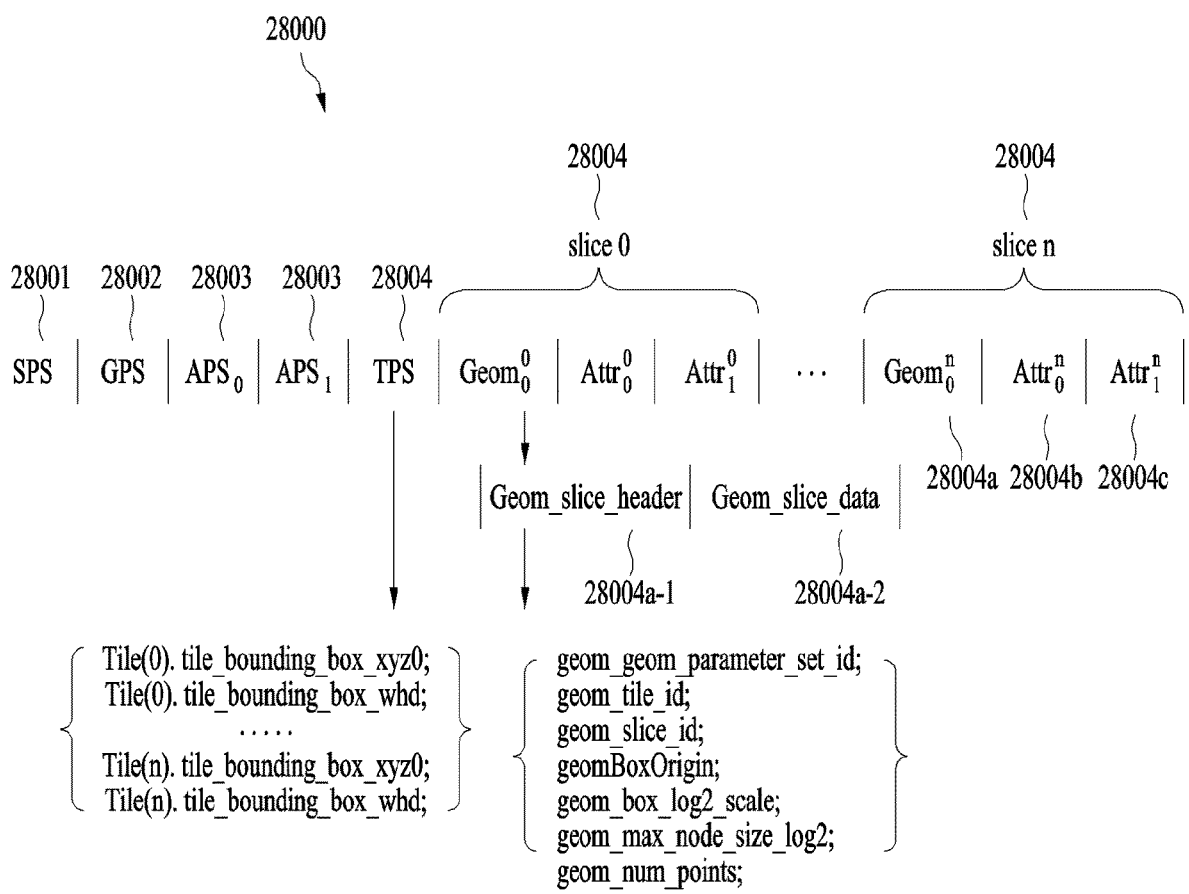
FIG. 28 illustrates an example of a bitstream structure of point cloud data according to embodiments.

FIG. 28 illustrates an example of a bitstream structure of point cloud data according to embodiments.

FIG. 28 illustrates a bitstream structure 28000 of point cloud data according to embodiments. The bitstream structure 28000 of the point cloud data shown in FIG. 28 may be generated by the transmitter 10003 of FIG. 1, the transmission unit 18002 of FIG. 2, the transmission processor 12012 of FIG. 12, the bitstream interleaving unit 16014 of FIG. 16, and the bitstream coupling unit 17000 of FIG. 17.

Parameters (which may be referred to by various terms such as metadata and signaling information) according to embodiments may be generated in the process of a transmitter according to the following embodiments, and may be transmitted to a receiver according to the embodiments for a reconstruction process.

For example, the parameters according to the embodiments may be generated by a metadata processor (or metadata generator) of the transmission device according to the embodiments, which will be described below, and be acquired by a metadata parser of the reception device according to the embodiments.

The bitstream structure 28000 of the point cloud data shown in FIG. 28 may be a bitstream received by the receiver 10005 of FIG. 1, the decoding unit 18003 of FIG. 2, the receiver 13000 of FIG. 13, or the receiver 35000 of FIG. 35 according to embodiments. The bitstream structure 28000 of the point cloud data shown in FIG. 28 may represent a geometry and attribute bitstream 36001 for each slice in FIG. 36.

The bitstream structure 28000 shown in FIG. 38 may be fully or partially generated by the XR device 1430 of FIG. 14. In addition, a brick described in this figure may correspond to a slice, or vice versa. In the present disclosure, the brick may be referred to as a slice.

The point cloud data transmission device according to the embodiments may transmit the bitstream 28000 having a bitstream structure as shown in FIG. 31. The bitstream 28000 of point cloud data may include a sequential parameter set (SPS) 28001, a geometry parameter set (GPS) 28002, an attribute parameter set (APS) 28003, a tile parameter set (TPS) 28004, and one or more slices (slice 0, slice 1, . . . , slice n) 28004. The bitstream 28000 of the point cloud data may include one or more tiles. The tile according to the embodiments may be a slice group including one or more slices. The bitstream 28000 provides tiles or slices such that point cloud data may be divided into regions to be processed. Each region of the bitstream 28000 may have different importance. Accordingly, when the point cloud data is divided into tiles, a different filter (encoding method) and a different filter unit may be applied to each tile. When the point cloud is divided into slices, a different filter and a different filter unit may be applied to each slice.

The point cloud data transmission device according to the embodiments may transmit point cloud data according to the structure of the bitstream 28000 as shown in FIG. 31, such that different encoding operations may be applied according to importance and a high quality encoding method may be used for important regions.

The point cloud data reception device according to the embodiments may apply different filtering (decoding method) for each region (divided into tiles or slices) according to the capacity of the reception device, instead of using a complex decoding (filtering) method throughout the point cloud data, thereby ensuring better image quality and proper latency on the system.

The Sequence Parameter Set (SPS) 28001 is a syntax structure containing syntax elements that apply to zero or more entire CVSs as determined by the content of a syntax element found in the PPS referred to by a syntax element found in each slice segment header. The SPS may include sequence information about the point cloud data bitstream according to the embodiments.

The Geometry Parameter Set (GPS) 28002 may represent a syntax structure including syntax elements that apply to zero or more entire geometry (or encoded geometry). The GPS 28002 may include information about a method for encoding attribute information of the point cloud data included in the one or more slices 28004. The GPS 28002 may include SPS identifier information indicating the SPS 28001 to which the included geometry parameter is related, and GPS identifier information for identifying the GPS.

The APS 28003 may represent a syntax structure including syntax elements that apply to zero or more entire attributes (or encoded attributes). The APS 28003 may include information about a method for encoding attribute information of the point cloud data included in the one or more slices 28004. The APS 28003 may include SPS identifier information indicating the SPS 28001 to which the included geometry parameter is related, and APS identifier information for identifying the APS.

The Tile Parameter Set (TPS) 28004 may represent a syntax structure including syntax elements that apply to zero or more entire tiles (or encoded tiles). A tile inventory includes information about zero or more tiles included in the point cloud data bitstream. According to embodiments, the tile inventory may be referred to as a tile parameter set (TPS).

The TPS 28004 may include identifier information for identifying one or more tiles and information indicating a range of the one or more tiles (i.e., a bounding box of the tile). The information indicating the range of the one or more tiles (i.e., the bounding box of the tile) may include coordinate information about a point that is a reference of a bounding box represented by a corresponding tile (e.g., Tile(n).tile_bounding_box_xyz0) and information about the width, height, and depth of the bounding box (e.g., Tile(n).tile_bounding_box_whd). When a plurality of tiles is present, the tile inventory 33004 may include information indicating a bounding box for each of the tiles. For example, when each tile is indicated as 0 to n by the identifier information for the tiles, the information indicating the bounding box of each tile may be represented as Tile(0).tile_bounding_box_xyz0, Tile(0).tile_bounding_box_whd, Tile(1).tile_bounding_box_xyz0, Tile(1).tile_bounding_box_whd, and so on.

The slice 28004 may be a unit of encoding of the point cloud data by the point cloud data transmission device. The slice 28004 may be a unit including one geometry bitstream Geom00 28004*a* and one or more attribute bitstreams Attr00 28004*b* and Attr10 28004*b*.

The slice 28004 may include a geometry slice (Geom) 28004*a* representing geometry information about the point cloud data included in the slice, and one or more attribute slices (Attr) 28004*b* representing attribute information about the point cloud data included in the slice.

The geometry slice (Geom) 28004*a* includes geometry slice data (Geom_slice_data) 28004*a*-2 including geometry information about the point cloud data, and a geometry slice header (GSH) (Geom_slice_header) 28004*a*-1 including information about the geometry slice data.

The GSH 28004*a*-1 contains information about the geometry slice data 28004*a*-2 in the slice. For example, the GSH 28004*a*-1 may contain a geometry parameter set identifier (geom_geom_parameter_set_id) for identifying the GPS 28002 representing the geometry information about the slice, and a geometry slice identifier (geom_slice_id) for identifying the geometry slice, geometry box origin information (geomBoxOrigin) indicating the origin of the box of the geometry slice data, information (geom_box_log 2_scale) indicating a logarithmic scale of the geometry slice, and information (geom_num_points) related to the number of points in the geometry slice.

When the point cloud data bitstream according to the embodiments contains one or more tiles, the header of the geometry bitstream may further contain information (geom_tile_id) for identifying a tile including the geometry bitstream.

The attribute slice (Attr) 28004*b* and 28004*c* includes attribute slice data (Attr_slice_data) containing attribute information about the point cloud data and an attribute slice header (ASH) (Attr_slice_header) 33005*c* containing information about the attribute slice data.

According to embodiments, parameters required to encode a point cloud may be newly defined as a parameter set and header information for the point cloud. For example, the parameters may be added to the attribute parameter set RBSP syntax in encoding attribute information, and be added to the tile_header syntax in performing tile-based encoding.

According to embodiments, information related to compression according to a prediction group may be defined in the aforementioned various parameter sets and/or a geometry slice header. The compression-related information may be defined in a corresponding position or a separate position according to an application or system, such that the application range, application method, and the like may be used differently.

The compression-related information may be defined in the attribute parameter set and/or the attribute slice header. As the compression-related information is included in the APS and ASH, it may be associated with or applied to attribute coding attribute coding.

Also, the compression-related information may be included in a sequence parameter set (SPS) and a tile parameter set. As the compression-related information is included in the SPS or the TPS, the transmission device may provide geometry scalability.

In addition, when the syntax element defined below is applicable not only to the current point cloud data stream but also to a plurality of point cloud data streams, it may be delivered through a parameter set of a higher concept.

The signaling information according to the embodiments may be generated in the compression (encoding) operation of the prediction-based scalable point cloud compression transmission device/method, and may be used in the decoding process of the prediction-based scalable point cloud compression reception device/method.

FIG. 29 shows a geometry parameter set (GPS) according to embodiments.

The geometry parameter set (GPS) shown in FIG. 29 represents the geometry parameter set 27002 described with reference to FIG. 28. The GPS may include, for example, the compression-related information described with reference to FIG. 28, and the signaling information shown in FIG. 20 (e.g., group_reference_mode, num_ref_groups, correlated_data_search_method, etc.).

The GPS may include, for example, gps_geometry_prediction_flag.

When the value of gps_geometry_prediction_flag is 1, it indicates that the prediction-based point cloud encoding method according to the embodiments is used. It may be informed that a parameter related to the prediction-based point cloud encoding method is delivered transmitted through the GPS, a geometry slice, or a related parameter container. When the value of this parameter is 0, it indicates that the prediction-based point cloud compression is not used and another compression method is used.

When the value gps_geometry_prediction_flag is 1, the GPS according to the embodiments further includes geom_pred_grouping_method and num_pred_groups as information. These parameters represent the geom_pred_grouping_method and num_pred_groups described with reference to FIG. 18.

The information geom_pred_grouping_method may indicate a method for generating a prediction group according to embodiments. For example, among the values of this parameter, 0 may indicate generation of an LOD based on the distance of points, 1 may indicate generation of an LOD based on octree sampling, and 2 may indicate generation of a group based on a region-based adjacent point.

The information num_pred_groups may indicate the number of prediction groups used when the prediction-based point cloud compression according to the embodiments is used.

The GPS according to the embodiments includes num_ref_groups as many as the number of prediction groups indicated by num_pred_groups.

The information num_of_ref_groups indicates the number of other prediction groups used to predict geometry information about points in a specific prediction group when a plurality of prediction groups is used for prediction encoding. When the value of this parameter is 0, it indicates that points in the corresponding prediction group (i-th prediction group) are predicted based only on points present in the prediction group (i-th prediction group).

When the value of num_of_ref_groups is greater than 0, that is, the number of other prediction groups used to predict the geometry information about points in a specific prediction group is greater than or equal to 1, the GPS further includes group_ref_mode indicating a method for defining candidate prediction groups for use in the corresponding prediction group (the i-th prediction group).

The information group_ref_mode indicates a method for defining a candidate group of another prediction group used for prediction of a point in the corresponding prediction group (the i-th prediction group).

For example, when the value of group_ref_mode is 0, the GPS further includes num_ref_groups indicating the number of immediately preceding consecutive prediction groups to be referenced. Here, the information num_ref_groups indicates the number of immediately preceding prediction groups that are referenced and/or used to predict the geometry information about a point in the corresponding prediction group (the i-th prediction group). For example, when the value of this parameter is 3, it may indicate that the geometry information about points in a retained group of level 5 is predicted based on the points in the last three retained groups.

For example, when the value of group_ref mode is 1, it may indicate that the encoder uses num_ref_groups non-consecutive prediction groups. Here, num_ref_groups indicates the number of other prediction groups that are referenced and/or used to predict the geometry information about a point in the corresponding prediction group (the i-th prediction group). For example, when the value of this parameter is 3, the geometry information about points in the retained group of level 5 may be predicted based on the points in the retained groups of level 1, level 2, and level 4.

For example, when the value of group_ref_mode is 1, the GPS further includes ref_index, which is information for identifying other referenced prediction groups.

The information ref_index may indicate indexes of other prediction groups used to predict points in the corresponding prediction group (the i-th prediction group).

For example, when the value of group_ref_mode is 2, it may indicate that all prediction groups are used to predict the corresponding prediction group (the i-th prediction group). When a prediction group is defined based on the LoD, it may be defined in the same meaning as using the current LoD.

When the value of gps_geometry_prediction_flag is 1, the GPS according to the embodiments may further include correlated_data_search_method, pred_method, pred_param_a, and pred_param_b. These parameters represent pred_method, pred_param_a, and pred_param_b described with reference to FIG. 18.

The information correlated_data_search_method indicates a method for searching for a parent of each point. For example, when the value of this parameter is 0, the related data (adjacent point) is searched for by traversing the points in input order to find the parent of the point. For example, when the value of this parameter is 1, the related data (adjacent point) is searched for by traversing the points in order of time stamps. For example, when the value of this parameter is 2, the search is performed in order of Morton codes of the points. When the value of this parameter is 3, the search is performed in order of radii (and/or azimuths and/or elevations) from the LiDAR center axis. When the value of this parameter is 4, the search is performed in order of horizontal angles with respect to the LiDAR center axis. When the value of this parameter is 5, the search is performed in order vertical angles with respect to the LiDAR.

pred_method, pred_param_a, and pred_param_b represent a prediction method and related parameters, respectively, when prediction-based point cloud compression is used. When pred_method is signaled within the GPS, it indicates that the same prediction method is used for the frame currently referenced by the GPS. When pred_method is signaled in the geometry slice header (GSH), it may indicate that the same method is used in the slice. A different method may be signaled according to each vertex point. Each method may be defined as follows.

1) Method 1 (pred_method=0): $V'(p)=a*V(p-1)+b$
2) Method 2 (pred_method=1): $V'(p)=(a+1)*V(p-1)-a*V(p-2)+b$
3) Method 3 (pred_method=2): $V'(p)=(a-1)*V(p-1)+a*V(p-2)+2b$
4) Method 4 (pred_method=3): $V'(p)=V(p-1)+a*V(p-2)-a*V(p-3)+b$
5) Method 5 (pred_method=4): $V'(p)=(a-1)*V(p-1)+(a-1)*V(p-2)+a*V(p-3))+3b$
6) Method 6 (pred_method=5): $V'(p)=V(p-1)+(a-1)*V(p-2)+a*V(p-3)+a*V(p-4)+3b$
7) Method 7 (pred_method=6): $V'(p)=(a+2)V(p-1)-(2a+1)*V(p-2)+a*V(p-3)+b$ When the value of gps_geometry_prediction_flag is 1, the GPS according to the embodiments includes transform_enable_flag and qnant_mode as information.

When the value of transform_enable_flag is 1, it indicates that the transform method illustrated in FIG. 27 is used.

qnant_mode indicates a method for determining a quantization weight according to embodiments. For example, when the value of this parameter is 0, quantization is not used. When the value of this parameter is 1, the quantization weight may be determined according to the number of times a group is referenced. When the value of this parameter is 2, the quantization weight may be determined according to the number of times a vertex is referenced. When the value of this parameter is 3, the quantization weight may be determined according to a coding order of vertexes from the root node. When the value of this parameter is 4, the quantization weight may be determined according to the number of child nodes.

FIG. 30 shows a geometry slice header (GSH) and geometry slice data according to embodiments.

A geometry slice bitstream according to embodiments contains a geometry slice header (GSH) and geometry slice data. A geometry slice bitstream represents the Geom of FIG. 28. The geometry slice bitstream may have the following syntax.

TABLE 3

| | Descriptor |
|---|---|
| general_geometry_slice_bitstream( ) { | |
| geometry_slice_header( ) | |
| geometry_slice_data( ) | |
| } | |

FIG. 30(A) shows a geometry slice header (GSH). The GSH shown in FIG. 30(A) represents the geometry slice header 28005*a*-1 of FIG. 28.

The GSH according to the embodiments may include geom_pred_grouping_method, num_of_ref_groups, group_ref_mode, num_ref_groups, ref_index, correlated_data_search_method, pred_method, pred_param_a, pred_param_b, transform_enable_flag, and/or qnant_mode.

As shown in FIG. 29, the GSH according to the embodiments may include some of all of geom_pred_grouping_method, num_of_ref_groups, group_ref_mode, num_ref_groups, ref_index, correlated_data_search_method, pred_method, pred_param_a, pred_param_b, transform_enable_flag, and/or qnant_mode.

The GSH according to the embodiments may further include gsh_num_points as information.

The information gsh_num_points may indicate the number of points representing vertexes in a slice.

FIG. 30(B) shows geometry slice data. The geometry slice data shown in FIG. 30(B) represents the geometry slice data 28005*a*-2 of FIG. 28.

When the value of gps_geometry_prediction_flag is 1 (true), the geometry slice data according to the embodiments may include some or all of the information children_count, num_ref_groups, pred_method, pred_param_a, pred_param_b, and one or more values of residual as much as the number of points indicated by gsh_num_points shown in FIG. 30(A).

The geometry slice data according to the embodiments includes, for each point, ref_index indicating the identifier of the referenced prediction groups as many as the number of referenced groups (the value of num_ref_groups).

The information children_count indicates the number of child nodes of a specific vertex (point).

FIG. 31 shows a sequence parameter set (SPS), a geometry parameter set (GPS), and an attribute parameter set (APS) according to embodiments.

The point cloud data transmission device (encoder) according to the embodiments may encode attribute information based on grouped points (e.g., prediction groups) to predict the geometry information. That is, the encoder according to the embodiments may encode the attribute information using the same prediction groups (LOD groups, retained groups) generated in encoding the geometry information. Due to the configuration of the encoding, the encoder according to the embodiments may shorten the encoding time, and may access the attribute encoding and the geometry encoding in parallel, thereby ensuring more efficient encoding.

In order to perform such geometry encoding and/or attribute encoding, the point cloud data transmission device according to the embodiments may further add related information to the SPS, the GPS, and/or the APS according to the embodiments.

The SPS (sequence_parameter_set( )) shown in FIG. 31 may represent the SPS 28001 described with reference to FIG. 28. The GPS (geometry_parameter_set( )) shown in FIGS. 29 and 31 may represent the GPS 28002 described with reference to FIG. 28. The APS (attribute_parameter_set( )) shown in FIG. 31 may represent the APS 28003 described with reference to FIG. 28.

The SPS according to the embodiments may include common_grouping_method_flag to assist in deriving the above configuration and effects.

common_grouping_method_flag equal to 1 may indicate that a grouping method according to the same embodiments is used when geometry information encoding and attribute information encoding are performed.

That is, when the transmission device (encoder) according to the embodiments performs geometry encoding and/or attribute encoding based on the same grouping method, the value of the common_grouping_method_flag may be 1. On the other hand, when the transmission device (encoder) according to the embodiments performs geometry encoding and/or attribute encoding based on different grouping methods, the value of the common_grouping_method_flag may be 0.

When the value of the common_grouping_method_flag is 1, the reception device (decoder) according to the embodiments decodes geometry information and/or attribute information about points based on the same grouping method in performing geometry decoding and attribute decoding.

When the value of common_grouping_method_flag is 0, the reception device (decoder) according to the embodiments performs geometry decoding and attribute decoding, based on other grouping methods, geometry information and/or attributes of points Decode the information.

When the transmission device (encoder) according to the embodiments encodes the geometry information and/or attribute information about points based on the same grouping method, common_grouping_method_flag in the SPS may be set to 1, and the transmission device (encoder) according to the embodiments may further include information indicating the corresponding common grouping method (e.g., common_pred_grouping_method).

When the reception device (decoder) according to the embodiments decodes geometry information and/or attribute information about points based on the same grouping method (that is, the value of common_grouping_method_flag is 1), the SPS according to the embodiments may further include information indicating a corresponding common grouping method (e.g., common_pred_grouping_method).

On the other hand, when the transmission device (encoder) according to the embodiments encodes the geometry information and/or attribute information about points based on different grouping methods, the transmission device (encoder) according to the embodiments sets common_grouping_method_flag of the SPS to 0. In addition, the encoder according to the embodiments may add information indicating a grouping method used to encode the geometry information (e.g., geom_pred_grouping_method) the GPS, and add information indicating a grouping method used to encode the attribute information (e.g., attr_pred_grouping_method) to the APS.

When the reception device (decoder) according to the embodiments may decode the geometry information and/or attribute information about points based on different grouping methods (that is, the value of the common_grouping_method_flag in the SPS is 1). In this case, the decoder encodes the geometry information based on information indicating a grouping method used to encode the geometry information included in the GPS (e.g., geom_pred_grouping_method). Also, in this case, the decoder encodes the attribute information based on information indicating a grouping method used to encode the attribute information included in the APS (e.g., attr_pred_grouping_method).

For example, the encoder/decoder may encode/decode may perform encoding/decoding using the LOD in the attribute encoding/decoding based on, for example, prediction lifting, and the same LOD used to encode the geometry information may be used. In this case, by signaling this configuration in the sequence level, that is, the SPS, the overlapping execution time of the encoder/decoder may be shortened. On the other hand, when different grouping methods are used for the position and attributes, each method may be signaled.

The information common_pred_grouping_method may indicate a method for generating a prediction group according to embodiments. For example, among the value of this information, 0 may indicate distance-based LoD generation, 1 may indicate octree sampling-based LoD generation, and 2 may indicate generation a group using region-based neighbor points.

The information attr_pred_grouping_method may indicate a method for generating a prediction group used to encode attribute data. For example, among the value of this information, 0 may indicate distance-based LoD generation, 1 may indicate octree sampling-based LoD generation, and 2 may indicate generation a group using region-based neighbor points.

Figure 32:
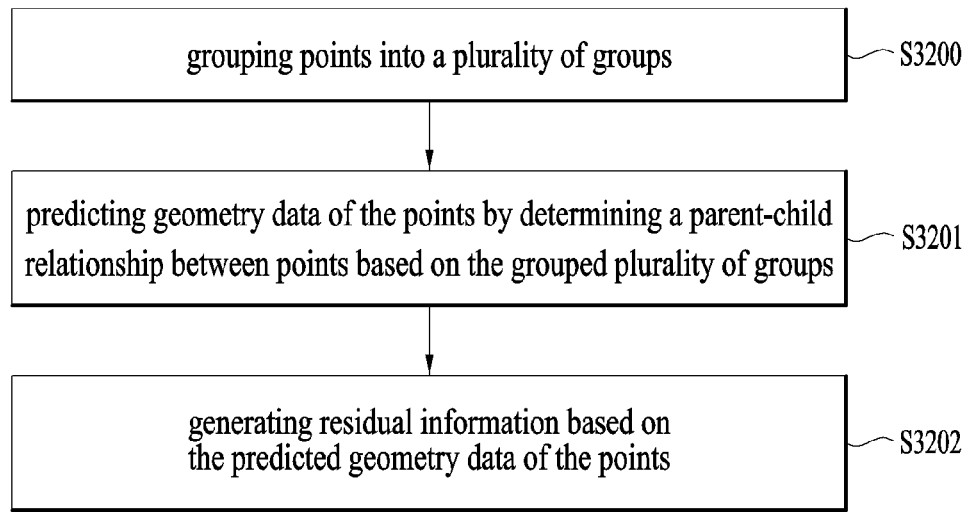
FIG. 32 is a flowchart illustrating a process of encoding point cloud data by a point cloud data transmission device according to embodiments.

FIG. 32 is a flowchart illustrating a process of encoding point cloud data by a point cloud data transmission device according to embodiments.

The operation of encoding the point cloud data by the point cloud data transmission device according to the embodiments may include grouping points into a plurality of groups (S3201), predicting geometry data about the points by determining a parent-child relationship between points based on the grouped plurality of groups (S3202), and/or generating residual information based on the predicted geometry data about the points (S3203).

In operation S3201, the point cloud data transmission device according to the embodiments groups the geometry data of the point cloud data into a plurality of groups. For example, operation S3201 may be performed by the encoder 15002, 15003 of FIG. 15, the LOD generator 16002 of FIG. 16, or the point cloud data grouping unit 18000 of FIG. 18. Operation S3201 may represent the data grouping 20000 of FIG. 20.

For example, in operation S3201, signaling information (e.g., pred_grouping_method, num_pred_groups, num_of ref_groups, group_ref mode, num_ref_groups, num_ref_groups, ref_index, etc. according to the embodiments) required for a transmission device and/or a reception device to group the geometry data may be generated.

In operation S3201, namely, the grouping operation, a plurality of retained groups may be generated based on a level of detail (LOD). The LOD may represent a set of points spaced apart by a distance shorter than a sampling distance corresponding to each level. Also, the retained groups may represent groups of points corresponding to a difference between the LOD of the current level and the LOD of the next level for each level.

The plurality of groups according to the embodiments may represent, for example, the LOD groups and/or retained groups according to the embodiments shown in FIG. 22.

In operation S3202, the point cloud data transmission device according to the embodiments determines a parent-child relationship between the points based on the grouped plurality of groups, and predicts the geometry data about the points. For example, operation S3202 may be performed by the encoder 15002, 15003 of FIG. 15, the geometry coding 16003a of FIG. 16, or the group-based prediction unit 18001 of FIG. 18.

The operation of the point cloud data transmission device determining the parent-child relationship between the points may represent the correlated data search 20001 of FIG. 20. In the operation of determining the parent-child relationship, related signaling information (e.g., correlated_data_search_method according to embodiments, etc.) may be generated. The parent-child relationship may be referred to by various terms such as an adjacency relationship, a parent-child node relationship, or the like.

In the operation of predicting the geometry data about the points, a prediction tree according to embodiments may be generated based on the plurality of groups. That is, in the predicting operation, the geometry data about the points is predicted based on the prediction tree indicating the parent-child relationship between the points.

For example, the operation of the transmission device generating the prediction tree may be performed based on the operations illustrated in FIGS. 23 to 25. For example, as illustrated in FIG. 23, a parent of points in a retained group of a first level may be one of the points included in the retained group of the first level. Also, as illustrated in FIG. 24, the parent of the points in the retained group of the first level may be one of the points included in a retained group of a second level, which is higher than the first level. Also, as illustrated in FIG. 25, the parent of the points in the retained group of the first level may be one of the points included in the LOD group of the first level. The transmission device according to the embodiments may signal the information indicating a grouping method to the reception device as described above. The reception device receives the information indicating the grouping method, and generates the prediction tree according to the embodiments.

Operation S3203 is a operation of generating residual information based on the predicted geometry data about the points. For example, operation S3203 may be performed by the encoder 15002, 15003 of FIG. 15, the geometry coding 16003a of FIG. 16, or the group-based prediction unit 18001 of FIG. 18. For example, in operation S3203, the residual information generation operation 20003 of FIG. 20 is performed.

In operation S3203, residual information about each point may be generated based on the prediction tree according to the embodiments shown in FIG. 26. The residual information may represent a difference between the predicted geometry data about each point, generated by operation S3202 of the transmission device, and the actual geometry data about the point.

The point cloud data transmission device according to the embodiments may quantize and/or transform the residual information about each point generated by S3203.

Figure 33:
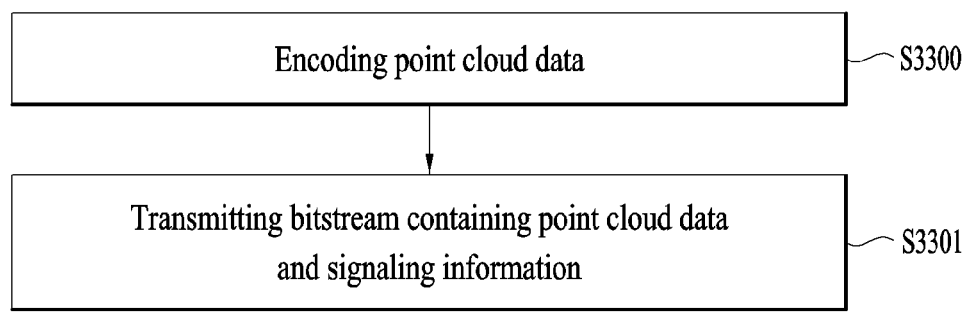
FIG. 33 is a flowchart illustrating a method for transmitting point cloud data according to embodiments.

FIG. 33 is a flowchart illustrating a method for transmitting point cloud data according to embodiments.

The method for transmitting point cloud data according to embodiments may include encoding point cloud data (S3300), and/or transmitting a bitstream containing the point cloud data and signaling information (S3301).

In operation S3300, the point cloud data is encoded. For example, operation S3300 may represent/include the point cloud video encoder 10002 of FIG. 1, the encoding unit 20001 of FIG. 2, the elements shown in FIGS. 4 and 12, the encoder 15002, 15003 of FIG. 15, and the the components shown in 16. In operation S3300 of encoding the point cloud data, some or all of the operations illustrated in FIGS. 18 to 27 may be performed. In operation S3300 of encoding the point cloud data, some or all of the signaling information (parameters) shown in FIGS. 28 to 31 may be generated.

Operation S3300 of encoding the point cloud data may include, for example, encoding geometry data and/or encoding attribute data.

The encoding of the geometry data may include some or all of the operations shown in FIG. 32. For example, the encoding of the geometry data may include grouping the points into a plurality of groups; determining a parent-child relationship between the points by predicting geometry data about the points based on the grouped plurality of groups; and/or generating residual information based on the predicted geometry data about the points.

The grouping may generate a plurality of retained groups based on, for example, an LOD. Here, the LOD represents a set of points spaced apart by a distance shorter than a sampling distance corresponding to each level, and the retained groups may represent groups of points corresponding to a difference between the LOD of the current level and the LOD of the next level for each level.

For example, a parent of points in a retained group of a first level may be one of the points included in the retained group of the first level. The parent of the points in the retained group of the first level may be one of the points included in a retained group of a second level, which is higher than the first level. The parent of the points in the retained group of the first level may be one of the points included in the LOD group of the first level. Here, the signaling information may include information indicating a grouping method and/or information indicating a prediction method.

In the predicting operation, the geometry data about the points may be predicted based on a prediction tree indicating a parent-child relationship between the points.

In operation S3301, a bitstream containing the point cloud data and the signaling information may be transmitted, or one or more files generated by encapsulating the bitstream may be transmitted. The file may be, for example, a file in an ISOBMFF-based file format. That is, operation S3301 may include encapsulating the bitstream (the point cloud data and the signaling information) into a file prior to transmission.

For example, operation S3301 may be performed by the transmitter 10003 of FIG. 1, the transmission unit 20002 of FIG. 2, the transmission processor 12012 of FIG. 12, the storage 15004 of FIG. 15, or the bitstream interleaver 16004 of FIG. 16. For example, the bitstream may have the bitstream structure shown in FIG. 28.

Figure 34:
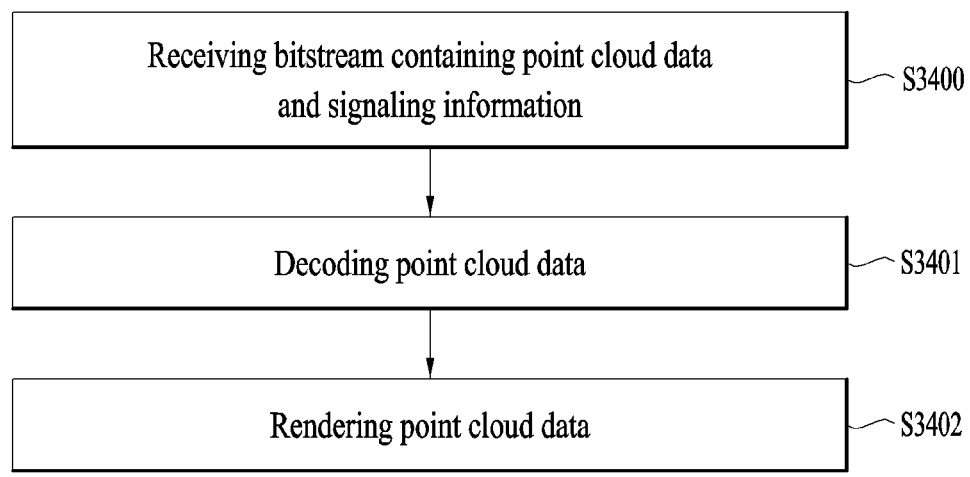
FIG. 34 is a flowchart illustrating a method for receiving point cloud data according to embodiments.

FIG. 34 is a flowchart illustrating a method for receiving point cloud data according to embodiments.

A method for receiving point cloud data according to embodiments may include receiving a bitstream containing point cloud data and signaling information (S3400), decoding the point cloud data (S3401), and/or rendering the point cloud data (S3402).

Operation S3400 is an operation of receiving a bitstream containing point cloud data and signaling information. Operation S3400 may be performed by, for example, the receiver 10005 of FIG. 1, the transmitter 20002 of FIG. 2, the receiver 13000 of FIG. 13, or the reception processor 13001 of FIG. 13.

In operation S3400, the complete PCC bitstream 15005a and/or the partial PCC bitstream 15005b) of FIG. 15 is received. In operation S3400, the bitstream shown in FIG. 17, the output geometry bitstream shown in FIG. 18, the geometry bitstream shown in FIG. 19, or the bitstreams shown in FIGS. 20 and 21 are received. The bitstream may conform to, for example, the structure of FIG. 28 and contain some or all of the parameters shown in FIGS. 29 to 31 as signaling information.

In operation S3401, the point cloud data is decoded. Operation S3401 may be performed by some or all of the point cloud video decoder 10006 of FIG. 1, the decoding unit 20003 of FIG. 2, the geometry decoder of FIG. 10, and the components shown in FIGS. 11 and 13. Operation S3401 may be performed by some/all of the decoders 15006a and 15006b of FIG. 15 and the components shown in FIGS. 17 and 19. In operation S3401, the operations illustrated in FIGS. 21 to 27 may be performed.

In operation S3402, the point cloud data is reconstructed and/or rendered. Operation S3402 is performed by the point cloud data reception device according to the embodiments. For example, operation S3402 may be performed by the renderer 10007 of FIG. 1, the rendering unit 20004 of FIG. 2, or the renderer 13011 of FIG. 13.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR INVENTION

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of transmitting point cloud data, the method comprising:
    encoding the point cloud data,
    wherein the encoding includes:
    generating levels of detail (LoDs) for the point cloud data,
    generating refinement lists including refinement points for the levels of detail,
    predicting a point in the refinement lists for a current level of detail by searching a neighboring point,
    wherein the point is predicted based on the refinement lists for a reference level of detail which is fewer than a total number of the levels of detail; and
    transmitting a bitstream including the point cloud data and signaling information.

2. The method of claim 1,
    wherein the searching the neighboring point is performed in a refined group,
    wherein the encoding further includes generating residual information based on the predicted point.

3. The method of claim 2,
    wherein the searching the neighboring point is performed in a same or another refined group in the level of detail,
    wherein the level of detail represents a set of points spaced apart by a distance shorter than a sampling distance corresponding to each level,
    wherein a refined group represents, for each level, a group of points corresponding to a difference between a current level of the level of detail and a next level of the level of detail.

4. The method of claim 3, wherein the predicting includes:
    predicting the point using a prediction tree representing an adjacency relationship between the points.

5. The method of claim 3, wherein:
    a parent of points in a refined group of a first level is one of points included in the refined group of the first level; or
    the parent of the points in the refined group of the first level is one of points included in a refined group of a second level; or the parent of the points in the refined group of the first level is one of points included in an LOD group of the first level.

6. The method according to claim 2, wherein the signaling information includes:
   information representing a method for generating the LoD; and
   information representing a method for the prediction.

7. The method of claim 2, wherein the predicting includes:
   determining an adjacency relationship by searching for the points in order of distances with respect to at least one of the points, elevation angles with respect to the points, or azimuth angles with respect to the points.

8. A device for transmitting point cloud data, the device comprising:
   an encoder configured to encode point cloud data,
   wherein the encoder is configured to:
   generate levels of detail (LoDs) for the point cloud data,
   generate refinement lists including refinement points for the levels of detail,
   predict a point the refinement lists for a current level of detail by searching a neighboring point,
   wherein the point is predicted based on the refinement lists for a reference level of detail which is fewer than a total number of the levels of detail; and
   a transmitter configured to transmit a bitstream including the point cloud data and signaling information.

9. The device of claim 8, wherein the encoder is configured to:
   search the neighboring point in a same refined group or another refined group in the level of detail, and
   generate residual information based on the predicted point,
   wherein the level of detail represents a set of points spaced apart by a distance shorter than a sampling distance corresponding to each level,
   wherein a refined group represents, for each level, a group of points corresponding to a difference between a current level of the level of detail and a next level of the level of detail.

10. The device of claim 9, wherein the encoder configured to predict the point using a prediction tree representing an adjacency relationship between the points,
    wherein:
    a parent of points in a refined group of a first level is one of points included in the refined group of the first level; or
    the parent of the points in the refined group of the first level is one of points included in a refined group of a second level; or
    the parent of the points in the refined group of the first level is one of points included in an LOD group of the first level.

11. The device according to claim 9, wherein the signaling information includes information representing a method for generating the level of detail and information representing a method for the prediction,
    wherein the predictor is configured to determine an adjacency relationship by searching for the points in order of distances with respect to at least one of the points, elevation angles with respect to the points, or azimuth angles with respect to the points.

12. A method of receiving point cloud data, the method comprising:
    receiving a bitstream including point cloud data and signaling information;
    decoding the point cloud data,
    wherein the decoding includes:
    generating levels of detail (LoDs) for the point cloud data, and
    generating refinement lists including refinement points for the levels of detail,
    predicting a point in the refinement lists for a current level of detail by searching a neighboring point,
    wherein the point is predicted based on the refinement lists for a reference level of detail which is fewer than a total number of the levels of detail.

13. The method of claim 12,
    wherein the searching the neighboring point is performed in a same group or another refined group in the level of detail,
    wherein the level of detail represents a set of points spaced apart by a distance shorter than a sampling distance corresponding to each level,
    wherein a refined group represents, for each level, a group of points corresponding to a difference between a current level of the level of detail and a next level of the level of detail
    wherein the decoding further includes:
    reconstructing the point cloud data based on the prediction.

14. The method of claim 13, wherein the prediction includes:
    predicting the geometry data about the points using a prediction tree representing an adjacency relationship.

15. A device for receiving point cloud data, the device comprising:
    a receiver configured to receive a bitstream including point cloud data and signaling information;
    a decoder configured to decode the point cloud data,
    wherein the decoder is configured to:
    generate levels of detail (LoDs) for the point cloud data, and
    generate refinement lists including refinement points for the levels of detail,
    predict a point in the refinement lists for a current level of detail by searching a neighboring point,
    wherein the point is predicted based on the refinement lists for a reference level of detail which is fewer than a total number of the levels of detail.

* * * * *